US012015494B2

(12) United States Patent
Waibel

(10) Patent No.: US 12,015,494 B2
(45) Date of Patent: Jun. 18, 2024

(54) SIDEBARS FOR VIRTUAL MEETINGS

(71) Applicant: Zoom Video Communications, Inc., San Jose, CA (US)

(72) Inventor: Alex Waibel, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/589,499

(22) Filed: Jan. 31, 2022

(65) Prior Publication Data

US 2023/0246861 A1 Aug. 3, 2023

(51) Int. Cl.
*H04L 12/18* (2006.01)
*G06F 3/0482* (2013.01)

(52) U.S. Cl.
CPC ........ *H04L 12/1818* (2013.01); *G06F 3/0482* (2013.01); *H04L 12/1822* (2013.01)

(58) Field of Classification Search
CPC ............ H04L 12/1818; H04L 12/1822; G06F 3/0482
USPC ...................................................... 709/204
See application file for complete search history.

(56) References Cited

U.S. PATENT DOCUMENTS

| | | | |
|---|---|---|---|
| 7,127,487 B1* | 10/2006 | Wang | H04M 3/56 709/248 |
| 8,804,577 B1* | 8/2014 | Kondapalli | H04M 3/561 379/212.01 |
| 11,153,442 B1* | 10/2021 | Balyasny | H04L 65/1089 |
| 2012/0128146 A1* | 5/2012 | Boss | H04M 3/564 379/202.01 |
| 2017/0279859 A1* | 9/2017 | Pogorelik | G06F 3/04817 |
| 2021/0352244 A1* | 11/2021 | Benedetto | H04N 7/15 |
| 2022/0408059 A1* | 12/2022 | Stonehocker | H04N 7/147 |

* cited by examiner

Primary Examiner — Nicholas R Taylor
Assistant Examiner — Chong G Kim
(74) Attorney, Agent, or Firm — Kilpatrick Townsend & Stockton LLP

(57) ABSTRACT

Systems and methods for providing sidebars during virtual meetings are provided herein. In an aspect, a system including a non-transitory computer-readable medium, a communications interface, and a processor is provided. The processor may be configured to execute processor-executable instructions stored in the non-transitory computer-readable medium to: establish a video conference having a plurality of participants, receive, from a first client device, a first audio stream and a first video stream, and receive, from the first client device, a request for a sidebar meeting with a second client device. The processor may be configured to establish the sidebar meeting, and responsive to establishing the sidebar meeting: terminate transmission of the first audio stream, and transmit to the first client device: a first set of audio and video streams corresponding to a main meeting, and a second set of audio and video streams corresponding to the sidebar meeting.

18 Claims, 13 Drawing Sheets

SIDEBARS FOR VIRTUAL MEETINGS

FIELD

The present application generally relates to videoconferences and more particularly relates to systems and methods for providing a sidebar meeting for participants in a virtual meeting room of a videoconference. In some aspects, the present application also generally relates to providing a voice agent functionality for participants in a sidebar meeting during a video conference.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
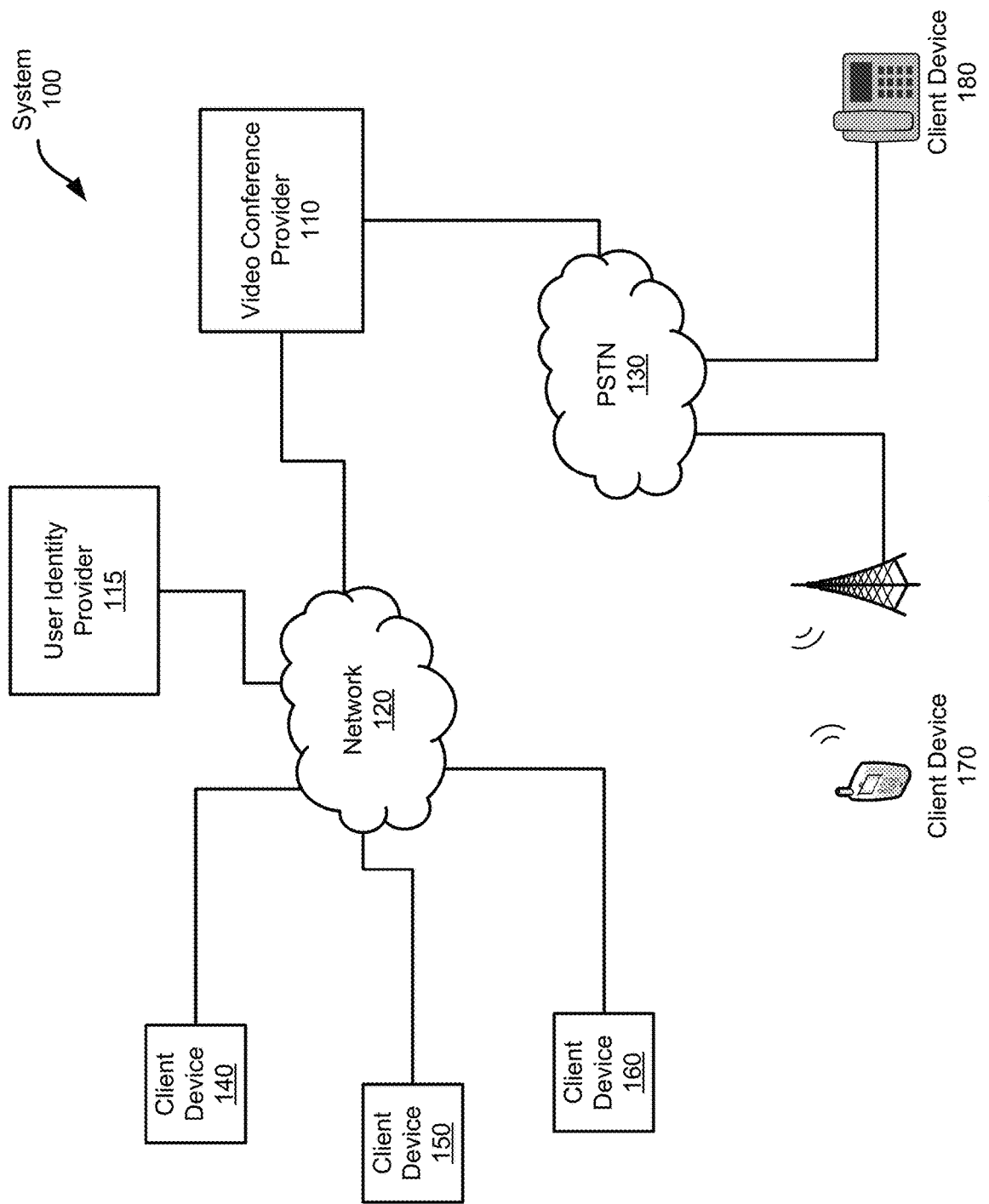
FIGS. 1, 2, and 3A-3B show example systems for providing a sidebar meeting during a virtual meeting, according to an embodiment herein.

Examples are described herein in the context of systems and methods for providing sidebar meetings for virtual meeting rooms associated with a videoconference, and for providing a voice agent functionality during the sidebar meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

During both webinars and conventional virtual meetings, one or more participants may want to engage in side conversations or interactions without interrupting the main presentation. For example, during a webinar a participant may want to ask another participant question about the presentation topic or discuss the presentation topic in further detail with the other participant. During a physical meeting, these participants may be able to whisper to each other during a presentation to communicate without interrupting the meeting. In the virtual space, however, engaging in a side conversation or whispering to a neighbor participant during a meeting is not feasible.

To allow participants to engage in a side conversation or a sidebar without interrupting the main presentation or disrupting the attention of other participants in the virtual meeting, a sidebar meeting may be provided. A sidebar meeting may be a separate channel in which two or more participants ("sidebar participants") can communicate with each other without disrupting the main meeting. For example, only the participants in the sidebar meeting may receive audio and video streams from other participants in the sidebar meeting. The remaining participants in the main meeting would not receive the audio and video streams from the participants in the sidebar meeting, thus allowing the main meeting to continue without disruption from the sidebar meeting.

One issue, however, that can arise from participating in a sidebar meeting is missing an attention cue, such as a direct question or a topic of interest. As noted above, virtual meetings can last for long durations and participants can become inattentive, especially participants in a sidebar meeting. For example, during the main meeting the presenter may direct a question to a sidebar participant and unless the sidebar participant is closely paying attention to the main meeting, the sidebar participant may miss the question. Similarly, a sidebar participant may miss a topic of interest by participating in a sidebar meeting. For example, during a virtual meeting covering numerous presentation topics, a sidebar participant may engage in a sidebar meeting during uninteresting topics. But unless the participant is paying close attention, the sidebar participant may miss a change to a topic of interest.

To allow participants to engage in a sidebar meeting without missing attention cues from the main meeting, a voice agent may monitor the main meeting for the attention cue. In some embodiments, the voice agent may monitor the main meeting for a keyword or phrase specific to a sidebar participant. For example, the voice agent may monitor the main meeting for the name of the sidebar participant, a topic of interest, or content that may be relevant to the participant. In other embodiments, the voice agent may monitor the main meeting for emotion recognition. For example, the voice agent may monitor the main meeting for a joke or laughter.

When the voice agent identifies an attention cue for a sidebar participant, the voice agent may alert the sidebar participant. For example, when an attention cue is identified, the sidebar participant may be prompted by a visual or audible alert. Upon the alert, the sidebar participant can rejoin the main meeting from the sidebar meeting and participate in the main meeting as desired.

This illustrative example is given to introduce the reader to the general subject matter discussed herein and the disclosure is not limited to this example. The following sections describe various additional non-limiting examples and examples of systems and methods for providing a sidebar meeting during a videoconference. Additional non-limiting examples may include examples of systems and methods for providing a voice agent functionality during a sidebar meeting.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
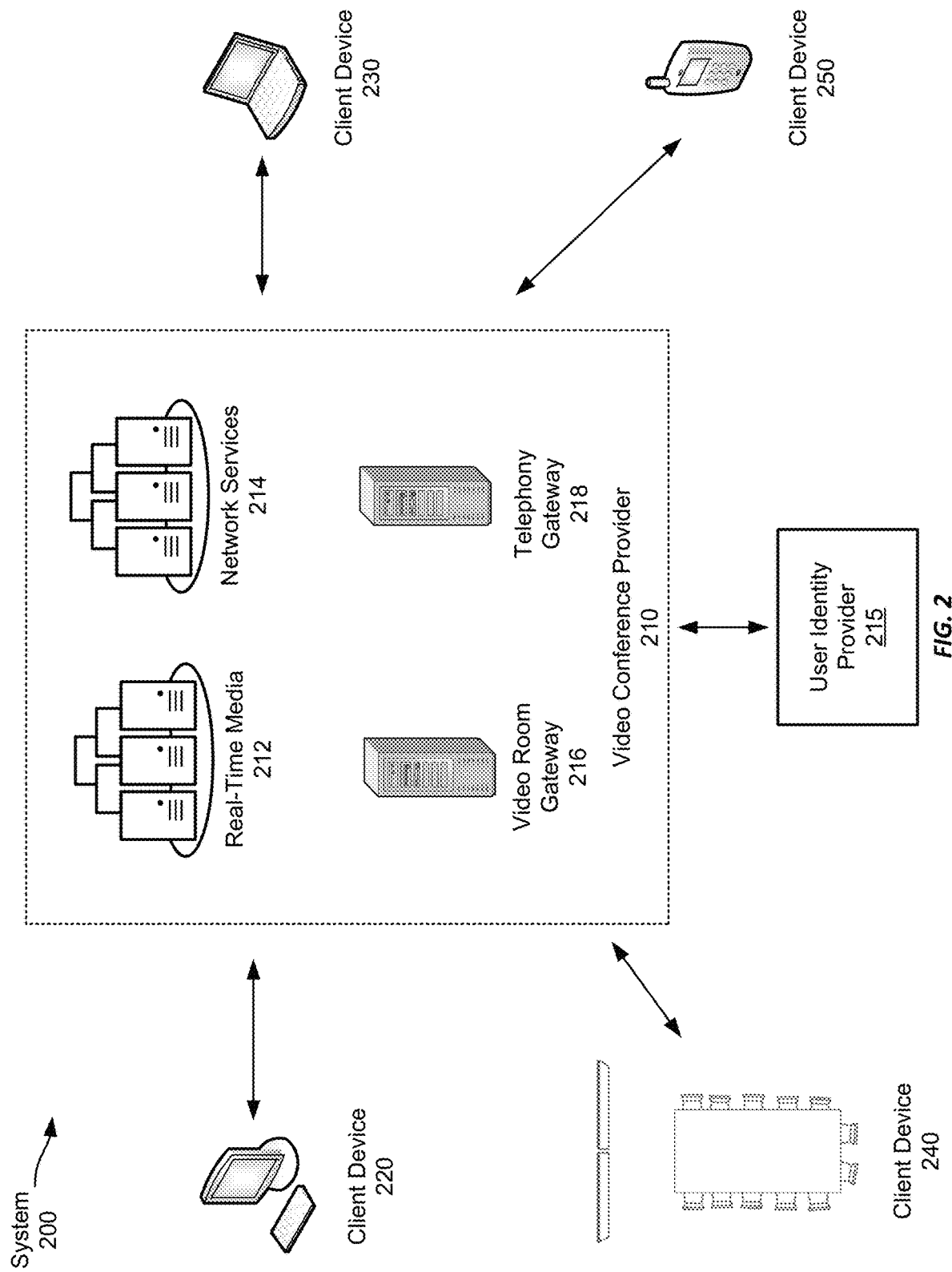

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "a sidebar meeting". A sidebar meeting as provided herein may be a "room" that is associated with a "main" videoconference room or "main meeting". Thus, participants who wish to engage in a sidebar conversation during the main videoconference may enter a sidebar virtual room to engage in a sidebar conversation, e.g., to discuss a particular topic, before returning to the main meeting.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode. As discussed in detail below, in some embodiments, the sidebar meeting may terminate, thereby disconnecting only participants in that sidebar meeting. The main meeting may continue allowing participants therein to continue exchanging audio and video streams.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a sidebar meeting, such a command may also be handled by a network services server 214, which may terminate the authorization of the one or more participants for joining the sidebar meeting. In some embodiments, the host may wish to join one or more participants in a sidebar meeting. The command to do so may be handled by a network services server 214, which may provide authorization information to the one or more participants to join the sidebar meeting and then connect the one or more participants to the sidebar meeting similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
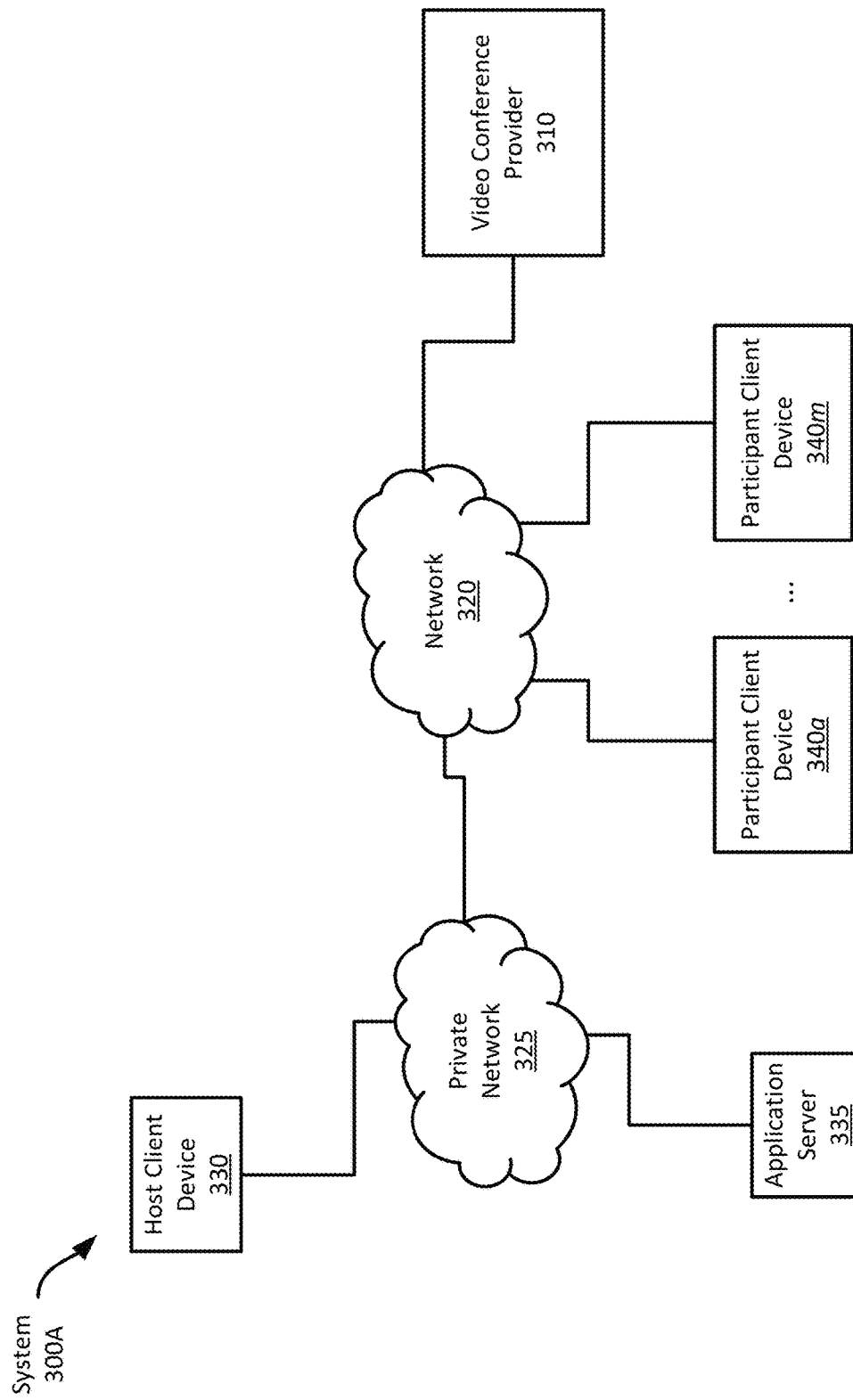

Referring now to FIG. 3A, FIG. 3A shows an example system 300 for providing a sidebar meeting during a main meeting. In this example, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above.

Once the main meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the webinar or certain select participants that will be engaged in discussions during the main meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

Figure 3B:
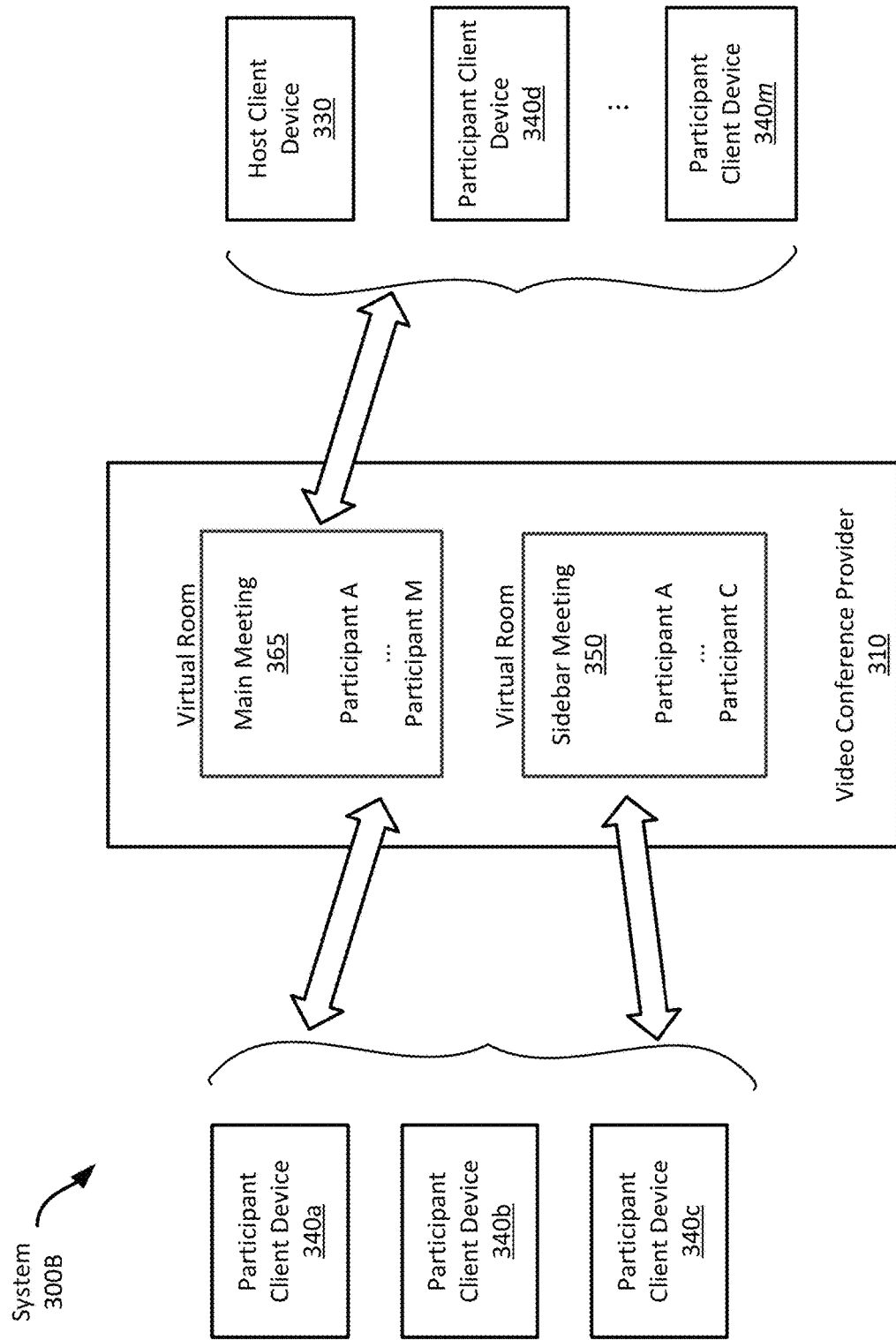

During the meeting, a participant may wish to engage in a sidebar conversation with one or more other participants of the main meeting. If a sidebar meeting is initiated by a participant, as described in greater detail below, the video conference provider 310 may also host the sidebar meeting. Referring now to FIG. 3B, a system 300B for hosting a main meeting 365 including a sidebar meeting 350 is provided, according to an embodiment herein. The video conference provider 310 may establish a main meeting 365, which hosts the main meeting event. The main meeting 365 may be considered a virtual "room" in which participants of the main meeting can meet and communicate. In some embodiments, the main meeting 365 may be a hybrid meeting in which one or more participants attend the meeting in person and one or more participants virtually join. For example, the main meeting 365 may be a physical, in-person meeting in which one or more participants join virtually. Participants of the main meeting may have various types of roles. For example, there may be one or more host role(s) (e.g., the participant corresponding to host client device 330) and one or more attendee role(s) (e.g., participants corresponding to client devices 340a-340m). In some embodiments, such as a webinar example, there may also be a panelist role in the main meeting.

During the main meeting 365, the participants may receive audio and video streams exchanged during the main meeting 365. For example, if the host is presenting on a topic, the audio and video streams from the host client device 330 may be received by the client devices 340a-m. The main meeting 365 may be an interactive virtual space where the participants can also contribute to the main meeting event. As such, audio and video streams from the client devices 340a-m may also be exchanged during the main meeting 365.

During the main meeting 365, a participant, such as participant A corresponding to the client device 340a, may want to engage in a sidebar conversation with other participants, such as participants B and C corresponding to the client devices 340b and 340c. To initiate a sidebar meeting, and thereby allow a sidebar conversation to occur without interrupting the main meeting event, participant A, via the client device 340a, may send a request to participants B and C, via the client devices 340b and 340c. As will be described in greater detail below with respect to FIG. 4, the request may be sent through video conference provider 310. When the client devices 340b and 340c accept the request, the video conference provider 310 may establish the sidebar meeting 350. The sidebar meeting 350 may be a virtual meeting space in which participants A, B, and C can meet to exchange dialogue (e.g., multimedia streams) without interrupting the main meeting 365 and without leaving the main meeting 365.

When the participant A establishes the sidebar meeting 350 with the participants B and C, the client devices 340a-c are able to exchange audio and video streams. Individuals who are not part of the sidebar meeting 350 (e.g., participants D-M, the host(s)), however, may not receive the audio and video streams from the client devices 340a-340c. Instead, as illustrated by FIG. 3B, the client devices 340d-340m and the host client device 330, may only receive the multimedia streams from main meeting 365. In this manner, individuals in the main meeting 365 who are not part of the sidebar meeting 350 may be unaware that participants A-C are engaged in a sidebar conversation.

Participants in the sidebar meeting 350, however, may continue to receive the audio and video streams from the main meeting 365 so that they do not miss any content presented during the main meeting 365 when engaging in the sidebar meeting 350. In the sidebar meeting 350, client devices 340a-c may receive audio and video streams from both the main meeting 365 and the sidebar meeting 350. Participants in sidebar meeting 350 are able to interact with the other participants in the sidebar meeting 350, such as by providing audio and video feeds and receiving audio and video feeds from the other sidebar meeting 350 participants. Participants in the sidebar meeting 350, however, cannot interact with participants in main meeting 365. In other words, participants in the sidebar meeting 350 can talk and share content with each other in the sidebar meeting 350 without attendees of the main meeting 365 being involved and without leaving the main meeting 365.

While the audio streams from the client devices 340a-c in the sidebar meeting 350 may only be received by the client devices 340a-c, so as to not disrupt the main meeting 365, the participants A-C can readily re-focus on the main meeting 365 as desired. As will be described in greater detail below, in some embodiments, the video streams from the client devices 340a-c, when in the sidebar meeting 350, may continue to be received by the other participants in the main meeting 365. In other embodiments, when the client devices 340a-c join the sidebar meeting 350, the participants in the main meeting may no longer receive the video streams from the client devices 340a-c while the participants A-C are in the sidebar meeting 350, but may instead see icons or virtual avatars in place of the participants' video streams.

Depending on the role of a particular participant in the main meeting, various restrictions may apply. A host may have little to no restrictions. The level of restrictions for a host role may be set by the video conference provider 310 or by the host. In cases where there is a co-host or more than one host role, hosts may have varying levels of restrictions. For example, a main host (e.g., the host who arranged the main meeting) may be running late and assign another participant the role of co-host to begin the main meeting on time. The main host may also assign various restrictions to the co-host, such as not allowing the co-host to change the roles of other participants.

The host (or co-host) may also be able to authorize a participant to join the sidebar meeting 350 or may terminate a sidebar meeting 350. For example, the host may receive a notification that the sidebar meeting 350 is established. This may allow the host to monitor the participants and in the event that the participants A-C become disruptive due to their participation in the sidebar meeting 350, e.g., they are not responding to questions or prompts in the main meeting due to being distracted in the side meeting, the host can terminate the sidebar meeting 350. In another example, the host may request to join a participant, such as participant D to the sidebar meeting 350. Upon initiation of the sidebar meeting 350, the host may receive an indication of which participants are part of the sidebar meeting 350. The host may realize that participant D should also be part of the sidebar meeting 350, and as such, request to add client device 340d to the sidebar meeting 350.

In other embodiments, however, the host may have no indication that a sidebar meeting 350 is established. By not providing an indication of the sidebar meeting 350 to the host, this may allow the sidebar meeting 350 to be as minimally disruptive to the main meeting 365 as possible. It may also allow participants to freely enter and exit a sidebar meeting 350 without concerns of disruption or recognition that they are engaging in a sidebar conversation.

It should be appreciated that more than one sidebar meeting 350 may be established during the main meeting 365. Any number of sidebar meetings 350 may be established. Once a main meeting 365 has started, the participants may engage in any number of sidebar meetings 350. Each participant, however, can only engage in a single sidebar meeting 350 at a time. Further, the participant can engage in consecutive sidebar meetings 350 throughout the duration of the main meeting 365 as desired. In embodiments where a participant is engaged in a sidebar meeting 350 and another participant requests that the participant engage in a different sidebar meeting, the other participant may receive a notification that the participant is in the sidebar meeting 350 and unavailable for a sidebar conversation. The participant in the sidebar meeting 350 may also receive a notification that the other participant requests a sidebar conversation. Upon receipt of the notification the participant can determine if he or she desires to exit the sidebar meeting 350 and enter another sidebar meeting with the other participant.

Any number of participants can be engaged in the sidebar meeting 350. For example, participants A-F may wish to engage in a sidebar conversation. Upon request and acceptance by each of the participants A-F to engage in the sidebar meeting 350, the video conference provider 310 may establish the sidebar meeting 350 and join the client devices 340a-f to the sidebar meeting 350 (not shown).

Figure 4:
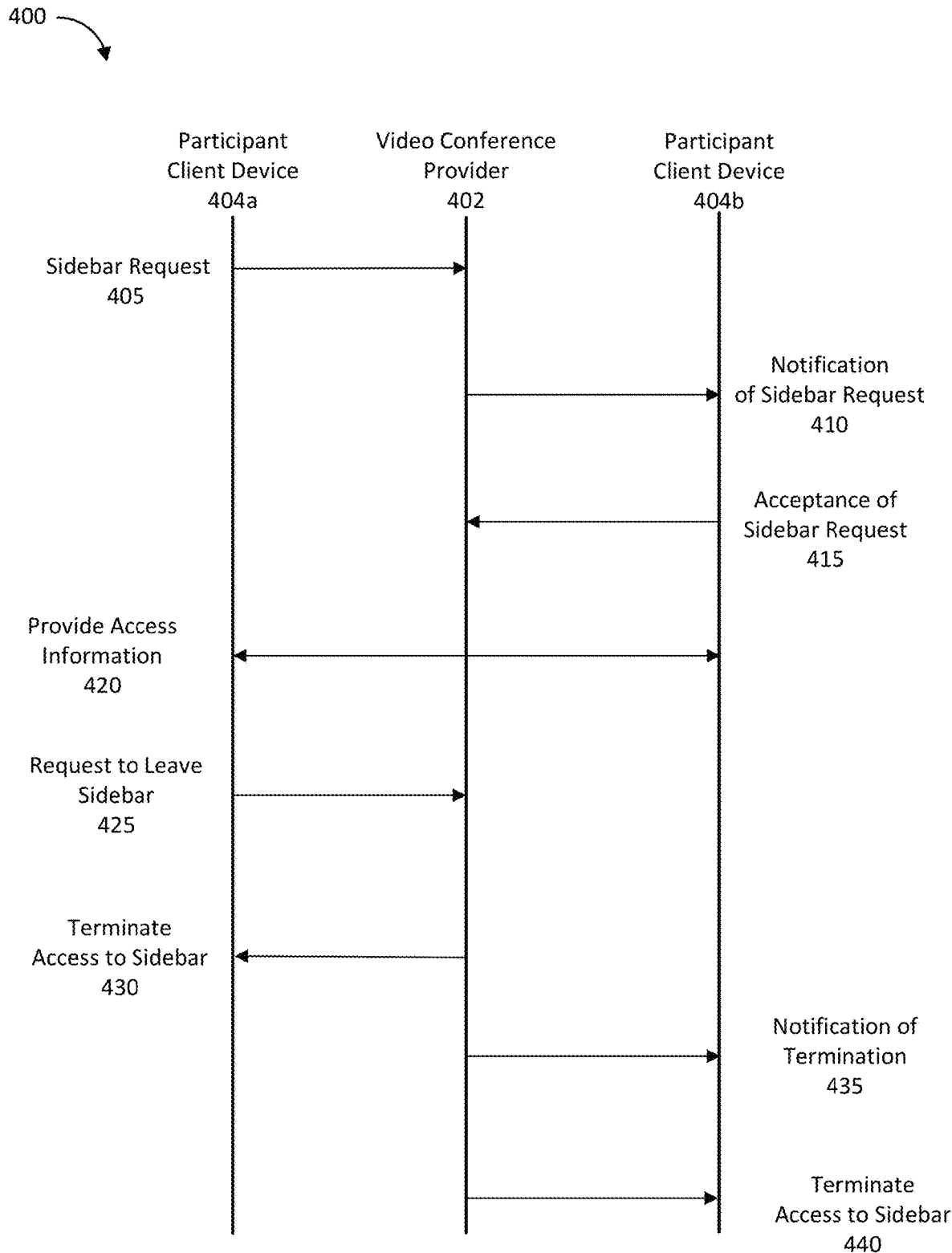
FIG. 4 shows an example sequence of events for engaging in a sidebar meeting during a video conference meeting, according to an embodiment herein.

Referring now to FIG. 4, FIG. 4 shows an example sequence 400 of events for engaging in a sidebar conversation (e.g., sidebar meeting) during a video conference meeting. Sequence 400 is described with respect to a system that includes a video conference provider 402, client device 404a, and a client device 404b. While client devices 404a and 404b are discussed with respect to FIG. 4, it should be appreciated that any number of client devices may participate in the sequence 400. Further, sequence 400 assumes that the client devices 404a and 404b are participating in the same on-going main meeting hosted by video conference provider 404.

At some time after the main meeting is initiated and client devices 404a and 404b are joined to the main meeting, participant A corresponding to client device 404a may wish to engage in a sidebar conversation with participant B, corresponding to client device 404b. To establish a sidebar meeting to hold the sidebar conversation, participant A may send participant B a request to engage in the sidebar conversation. To do so, the client device 404a may send a sidebar request to the video conference provider 402 (405). The video conference provider 402 may determine if the client device 404a has permission to establish a sidebar meeting. For example, if a host has previously barred participant A from establishing a sidebar meeting, then the video conference provider 402 may terminate sequence 400 at step (405). In some cases, the video conference provider 402 may transmit a notification to the client device 404a indicating that the participant A does not have authorization to establish a sidebar meeting (not shown).

After receiving the sidebar request (405), and in some cases verifying that the client device 404a has permission to establish a sidebar meeting (not shown), the video conference provider 402 may transmit a notification of the sidebar request to the client device 404b (410). The notification may include an option for the participant B to accept the sidebar request and an option to decline the sidebar request. If the participant B accepts the sidebar request, the client device 404b may send the acceptance of the sidebar request to the video conference provider 402 (415).

Upon receipt of the acceptance of the sidebar request from the client device 404b, the video conference provider 402 may establish a new virtual room for the sidebar meeting. Once established, the video conference provider 402 may provide access information for the sidebar meeting to the client devices 404a and 404b (420). The client devices 404a and 404b may then join the sidebar meeting to engage in a sidebar conversation as described herein. In some embodiments, the establishment of the sidebar meeting, transmission of access information to the client devices 404a and 404b, and joining of the client devices 404a and 404b to the sidebar meeting may be done nearly simultaneously and automatically. Once the client devices 404a and 404b join the sidebar meeting, the client devices 404a and 404b may begin to exchange audio and video streams with each other as well as the audio and video streams from the main meeting, as described above with reference to FIG. 3B.

When the participants A and B are done with their sidebar conversation and wish to return to the main meeting, one or both of the participants may indicate that they wish to exit the sidebar meeting. For example, as illustrated, the client device 404a may send a request to leave the sidebar meeting to the video conference provider 402 (425). The various methods and techniques in which the request is made are described in greater detail below. In some embodiments, the request to leave the sidebar meeting (425) may be a request to return to the main meeting.

Once the video provider 402 receives the request to leave the sidebar (425), the video conference provider 402 may terminate access to the sidebar meeting for the client device 404a (430). If the sidebar meeting only includes the participants A and B, once participant A leaves the sidebar meeting, the video conference provider 402 may terminate the sidebar meeting for participant B. To do so, the video conference provider 402 may transmit a notification of termination to the client device 404b (435). Then the video conference provider 402 may terminate access to the sidebar meeting for the client device 404b (440). Steps (435) and (440) may be performed simultaneously. Termination of access to the sidebar meeting may include termination of the virtual room in which the video conference provider 402 hosts the sidebar meeting. In embodiments where participants in addition to participants A and B are part of the sidebar meeting, when participant A leaves the sidebar meeting, the sidebar meeting may continue for participant B and steps (435) and (440) may not be performed until one or no participants remain in the sidebar meeting.

As mentioned above, the sequence 400 shown in FIG. 4 need not be performed as sequential steps, but instead, certain examples may be performed asynchronously to others. For example, if multiple different client devices are attempting to engage in a sidebar meeting, each may progress through a sequence similar to sequence items 405-420. Similarly, if multiple different client devices request to leave a sidebar meeting, each may progress through a sequence of similar steps to 425-440, depending on the number of participants remaining in the sidebar meeting.

Figure 5:
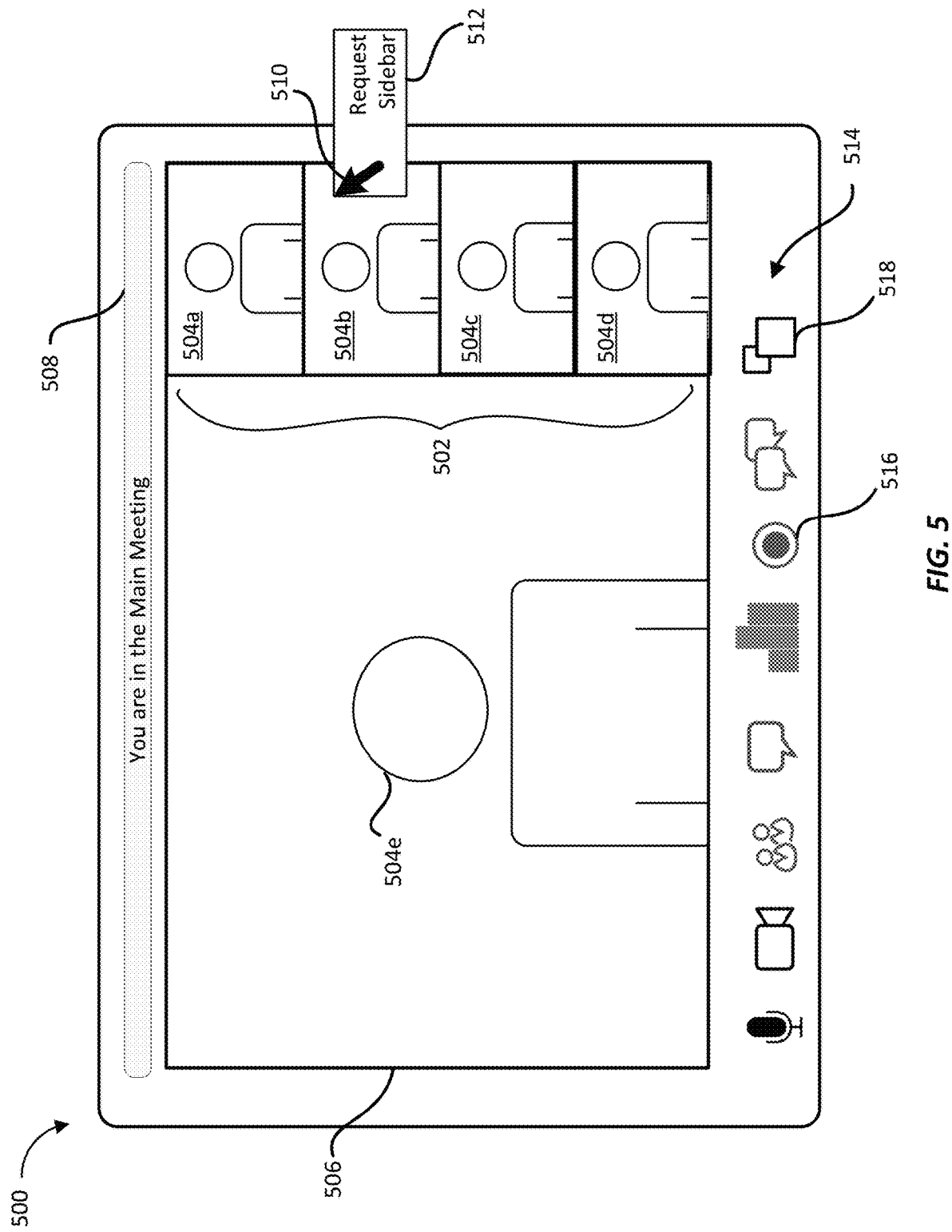
FIG. 5 illustrates a graphical user interface for a main meeting, according to an embodiment herein.

Referring now to FIG. 5, FIG. 5 illustrates a GUI 500 for a main meeting according to an embodiment. The GUI 500 may be presented to a participant or a host during a main meeting, such as the main meeting 365. The following figures and related components, such as GUI 500 of FIG. 5, will be described with respect to systems shown in FIGS. 3 and 4, however, any suitable system according to this disclosure may be employed, such as those described in FIGS. 1 and 2.

In some embodiments, a GUI 500 is viewable to a participant of the video conference on the participant's device, for example the GUI 500 may be viewable to participant A on the client device 404a. Presentation of the GUI 500 on the participant's device may be in response to the initiation of the video conference.

The GUI 500 may include a roster 502 of the participants 504a-e in the video conference. The roster 502 may include a video stream of some or all of the participants 504a-e. In other embodiments, the roster 502 may include a picture, image, representation, avatar or a listing of some or all of the participants 504a-e who have joined the main meeting. When a participant joins the video conference, the joining participant is added to the roster 502.

Once the main meeting is initiated, video and audio streams may be exchanged between the participants 504a-e. Display 506 may display the video stream of a currently speaking participant 504e. The audio stream from participant 504e may also be transmitted along with the display 506. In some embodiments, more than one participant may be speaking, and in such cases, display 506 may include two or more windows providing the video streams from the speaking participants.

To indicate to the participants 504a-e that they are in the main meeting, indication 508 may be provided. The indication 508 may be helpful for participants 504a-e to know that their audio and video streams are being transmitted to participants of the main meeting. If a participant is engaging in sidebar conversations throughout the main meeting, the participant could easily become confused as to which virtual meeting space he or she is in and accidently say or share something in the main meeting meant for the sidebar conversation.

At some time after the main meeting is initiated, one or more of the participants 504a-e may wish to engage in a sidebar conversation with another participant. For example, participant 504a may wish to speak with participant 504b in a sidebar meeting. To initiate a sidebar conversation, participant 504a may transmit a sidebar request to participant 504b. As illustrated, participant 504a may select the participant's 504b representation from the roster 502. For example, the participant 504a may right click using cursor 510 on the participant 504b in the roster 502 and an option to request a sidebar 512 may be presented. The participant 504a can then select the option to request a sidebar 512 and the request may be transmitted to participant 504b, as described above with respect to FIG. 4.

The GUI 500 may also include a dashboard 514 containing one or more action selections. For example, dashboard 514 may include a recording selection 516 that allows a participant to record the streams of audio and video during the video conference. In some embodiments, the dashboard 514 may include a sidebar selection 518. In such cases, if the participant 504a wants to engage in a sidebar conversation with participant 504b, the participant 504a may select the sidebar selection 518. Upon selection of the sidebar selection 518, the participant 504a may be prompted to input the participant's 504b information. The participant 504a may enter the participant's 504b name, select the participant 504b from the dialog box, or provide the participant's 504b information in any other manner. In an embodiment, the participant 504a may drag and drop the participant's 504b representation from the roster 502 onto the sidebar selection 518.

Once participant 504b, along with any other participants, is requested to join a sidebar conversation and at least one participant accepts the request, the video conference provider 402 may establish the sidebar meeting, such as sidebar meeting 350. Once the sidebar meeting is established the GUI 500 may visually change to indicate that the participant 504a is in a sidebar meeting with participant 504b.

Figure 6:
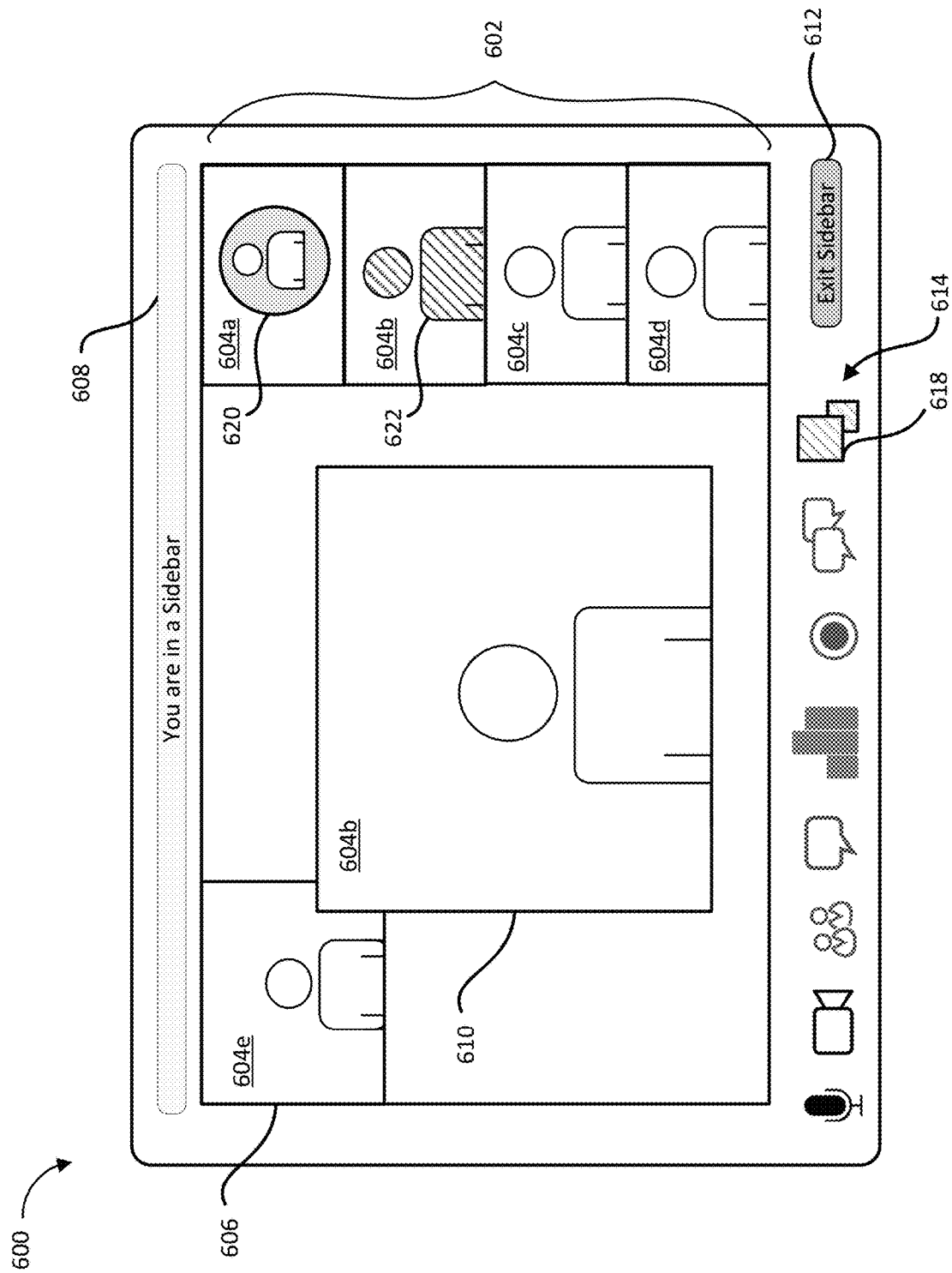
FIG. 6 illustrates a graphical user interface for a participant in a sidebar meeting, according to an embodiment herein.

Referring now to FIG. 6, a GUI 600 for a participant in a sidebar meeting is provided. As illustrated, the GUI 600 of the sidebar meeting is visibly different from the GUI 500 of the main meeting. In this example, the GUI 600 may be what is viewable to a participant in a sidebar meeting, such as participant 504a. Once the sidebar meeting is established, the main meeting display 606, which may correspond to display 506 from the GUI 500, may reduce in size and be repositioned away from the central focus of the GUI 500. And at the same time, a display 610 of the participant 604b's video stream may be enlarged and positioned in the central focus of the GUI 600. The sizing, arrangement, and configuration of the main meeting display 606 and the display 610 of the other sidebar participant(s) video stream may vary. In embodiments where there is more than one sidebar participant, the display 610 may include the additional sidebar participant's video stream, similar to how video streams are displayed in conventional video conferences. In this manner, the participant 504a can know what participants are engaged in the sidebar meeting.

While in the sidebar meeting, participants 504a and 504b can receive two audio streams: one from the main meeting 365 and one from the sidebar meeting 350. Upon entry into the sidebar meeting 350, the client devices of the sidebar participants (e.g., participants 504a and 504b) may be configured to target and provide audio from the sidebar meeting 350 over the audio from the main meeting 365, since the sounds from the two virtual meeting rooms would likely overlap, be difficult to understand, and may lack saliency if they were output to the client device at the same time.

To prevent the sidebar participants 504a and 504b from receiving the two audio streams at full volume at the same time, the sidebar participants 504a and 504b can adjust the volume of audio streams from the main meeting 365 to a background level while the audio streams from the sidebar meetings 350 remain at a normal audio level. In some cases, the audio level of each respective audio stream may be automatically adjusted upon entry into the sidebar meeting 350. For example, upon joining the sidebar meeting 350, the audio from the main meeting 365 may be muted and the audio from the sidebar meeting 350 may be provided at a normal level. The sidebar participants 504a and 504b may have the option to receive audio streams from both the main meeting 365 and the sidebar meeting 350, such as by reducing the volume of one of the two audio streams, or by playing each audio stream from a different audio output device, e.g., the main meeting audio is played from the left speaker and the sidebar meeting audio is played from the right speaker.

As will be described in greater detail below, if a sidebar participant 504a and/or 504b receives a notification of an attention cue, the sidebar participant can mute the audio streams from the sidebar meeting 350 and increase the volume of the audio streams from the main meeting 365. The sidebar participant may listen in on the main meeting 365 to determine whether he or she should switch from the sidebar meeting 350 to the main meeting 365, or should leave the sidebar meeting 350 to focus solely on the main meeting 365.

With the participants 504a and 504b engaging in the sidebar meeting, the GUI 600 may provide an indication 608 that the participants 504a and 504b are in a sidebar meeting, and not in the main meeting. For example, as illustrated, the indication 608 may notify or otherwise indicate that the participants 504a and 504b are in a sidebar meeting. In some embodiments, instead of a banner, like the indication 608, the background of the GUI 600 may change colors, or the display 606 of the main meeting may highlight, pulse, or toggle in size to indicate that the participants 504a and 504b are not in the main meeting.

Once the participants 504a and 504b enter the sidebar meeting, their representations as part of the roster 602 may change. If the participants' 504a and 504b representations in the roster 602 remain as a current video stream from their respective client devices, it could be confusing to participants 504c-e in the main meeting to see the participants 504a and 504b speaking without hearing the audio streams. As such, it could be desirable for the sidebar participants representations to change from a live video stream to a less conspicuous representation. For example, as illustrated, participant's 504a representation 620 may change to a static or generic picture of the participant 504a. In some embodiments, the representation 620 may be of an avatar of the participant 504. The participant's 504a representation 620 may be the same or similar to the representation that is presented when a video conference participant turns off his or her video stream.

In some cases, the representation may change to a near life-like representation 622 of the sidebar participant 504b. For example, in some cases, the participant 504b may desire to hide the fact that he or she has engaged in a sidebar conversation. As such, the participant 504b may establish a loop snippet of the participant 504b as the participant 504b normally acts in the main meeting. For example, the loop snippet may be of the participant 504b listening and watching the main meeting or of the participant 504b nodding or smiling occasionally. The loop snippet may run in a continuous loop (e.g., start to finish of the snippet sequentially) or the loop snippet may run from back and forth (e.g., from the start to the finish, from the finish to the start of the snippet). In an example embodiment, the loop snippet may be from 5 to 10 seconds in duration, from 10-15 seconds in duration, or from 15-30 seconds in duration.

To prepare the loop snippet, the participant 504b may be prompted to generate a loop snippet upon joining the main meeting or in some embodiments upon joining the sidebar meeting. For example, when the participant 504b joins the sidebar meeting, a prompt may be displayed to the participant 504b with an option to prepare the loop snippet. The participant 504b may accept the option to prepare the loop snippet, by for example, selecting a button or selection with that option. Upon accepting the option, a short segment of the video stream from the participant's 504b client device may be captured and recorded. In some embodiments, a short segment of video stream from the participant's 504b client device may be automatically captured and recorded without prompting the participant 504b. The short segment, which may be a 1 to 5 second segment, a 5 to 10 second segment, or a 10 to 30 second segment of the video stream, may be used to prepare the loop segment. As noted above, the short segment of video stream may be modified or altered, such as for example by looping the video segment, to create the loop snippet.

In other embodiments, the representation may indicate that the participant 504b is in a sidebar meeting, such as, artificially changing to indicate that the participant 504b is in the sidebar meeting. For example, the representation may illustrate the participant as turning away from the camera, change to an away symbol, or a caricature/cartoon of the participant 504b. The degree to which participants can hide their involvement in a sidebar meeting may be determined by the host. For example, when scheduling the meeting, the host may change one or more settings relating to the representation of the participant 504b. In some embodiments, the host may allow participants to hide their participation in a sidebar meeting, and thus allow loop snippets, while in other embodiments, the host may not allow participants to hide their participation in sidebar meetings. In such cases, when the participant 504b joins the sidebar meeting, the representation of the participant 504b may indicate that the participant 504b is in the sidebar meeting.

When the sidebar conversation is completed, and one or more of the sidebar participants wants to rejoin the main meeting, the sidebar participant may exit the sidebar meeting. For example, as illustrated, the GUI 600 may include an exit sidebar button 612. If participant 504a wishes to return to the main meeting and exit the sidebar meeting, the participant 504a may select the exit sidebar button 612 and the participant 504a may be returned to the main meeting. Upon exiting the sidebar meeting, the GUI 600 for the participant 504a may return back to the GUI 500. That is, the display 610 of the video stream from the other sidebar participants may disappear and the display 606 of the main meeting may enlarge and return to the main focus of the GUI 600, such as is illustrated by display 506 on GUI 500.

In some embodiments, instead of selecting the exit sidebar button 612, the participant 504a may select the sidebar selection 618 on dashboard 614. As illustrated, when the participant 504a enters the sidebar meeting, the sidebar selection 618 may change color or otherwise indicate that the participant 504a is in the sidebar meeting. For example, the change to the sidebar selection 618 may be similar to the recording selection 516 when it is selected to record; the sidebar selection 618 may pulse or otherwise highlight that the participant 504a is in a sidebar meeting. Upon selection of the sidebar selection 518, the sidebar participant 504a may rejoin the main meeting and exit the sidebar meeting.

As noted above, while in the sidebar meeting, the audio streams from the main meeting may be reduced or even muted. In such cases, when the participant returns to the main meeting, the audio streams from the main meeting may return to their normal volume.

As the sidebar participants 504a and 504b return to the main meeting, the representations 620 and 622, respectively, of the participants 504*a* and 504*b* may transition back to live video streams of the participants. The transition from the representations 620 and 622 to the live video streams may be smooth such to cause minimal disruption or change between the representations 620 and 622 and the live video streams. The transition may be smooth such that it is difficult to tell that the participants 504*a* and 504*b* are returning to the main meeting. For example, the video stream may perform a fade-in from a near life-like representation, such as near life-like representation 622, to the live video stream. In some embodiments, the transition may include frame interpolation between the representations 620 and 622 and the live stream. For example, video frames from the live video stream that are equal to each other and/or the representations 620 and 622 may be identified in a set duration of time before the transition. Then the equal video frames may be interpolated between until the representations 620 and 622 transition to the live video streams.

To assist the participants 504*a* and 504*b* with their transition back into the main meeting, a snippet replay of the previous few seconds of the main meeting may be provided to the participants 504*a* and 504*b*. When a participant receives an attention cue and transitions back into the main meeting from the sidebar meeting, the participant may not have the context to understand the attention cue. For example, if the voice agent identifies the participant's name from the main meeting audio stream, the participant, when alerted by the voice agent, may not appreciate why the speaker in the main meeting called on him or her. As such, the snippet replay may allow the transitioning participant to quickly gain context before responding to the attention cue.

The snippet replay may be a portion of the audio and video streams from the main meeting in the seconds leading up to the attention cue. For example, the snippet replay may include 5-30 seconds of audio and video streams leading up to the audio snippet including the attention cue. In some cases, the snippet replay may include a few seconds after the attention cue is identified. For example, the snippet replay may include 5 to 10 seconds after the attention cue is identified. To provide the snippet, the client software may maintain a circular recording buffer of a short period of the main meeting, e.g., 10-30 s, that may be configurable by the user. Thus, when changing focus to the main meeting 365, the participant may be presented with the option to review the recorded portion of the main meeting 365 as mentioned above.

To allow the participant to quickly review the snippet replay and respond to the attention cue in an appropriate amount of time, the snippet replay may be a sped-up version of the audio and video streams. For example, the snippet replay may include the previous 10 seconds of the audio and video streams, but may be replayed to the transitioning participant in 5 or less seconds. In other embodiments, the snippet replay may be shortened or modified for faster review. For example, filler or excess words, such as "um," and/or extended pauses or silences may be removed to generate the snippet replay. In this manner, the participant in the sidebar meeting can be alerted of the attention cue, provided context for the attention cue, and transition back into the main meeting as needed without missing context or information needed to respond to the attention cue. In other embodiments, a summarization of the previous 5-30 seconds of the main meeting may be provided. For example, an automatic summarization module may provide a brief summarization of the prior 5-30 seconds of the main meeting via the snippet replay.

In some embodiments, the snippet replay may be provided automatically when a participant requests to exit the sidebar meeting responsive to notification of the attention cue. In other embodiments, the GUI 600 may include a replay selection that the participant can select as desired. This will be described in greater detail below with respect to FIG. 9.

In some embodiments, although the participant 504*a* initiated the sidebar meeting with the participant 504*b*, the participant 504*b* may invite additional participants to join the sidebar meeting. That is, any of the main meeting participants 504*a-e* may invite other participants to engage in a sidebar conversation. In some embodiments, participants 504*c-e* remaining in the main meeting may be aware that participants 504*a* and 504*b* are in a sidebar meeting and may request to join the sidebar conversation.

In some cases, the participants 504*c-e* remaining in the main meeting (e.g., participants not in the sidebar meeting) may receive an indication or otherwise be aware that participants 504*a* and 504*b* are in a sidebar conversation. For example, in embodiments where the main meeting is a large number of participants and/or the main meeting is covering specific topics, sidebar conversations may be established to discuss various topics presented in the main meeting. As such, participants may want to join a specific sidebar conversation to participate in a discussion covering a certain topic from the main meeting.

Figure 7:
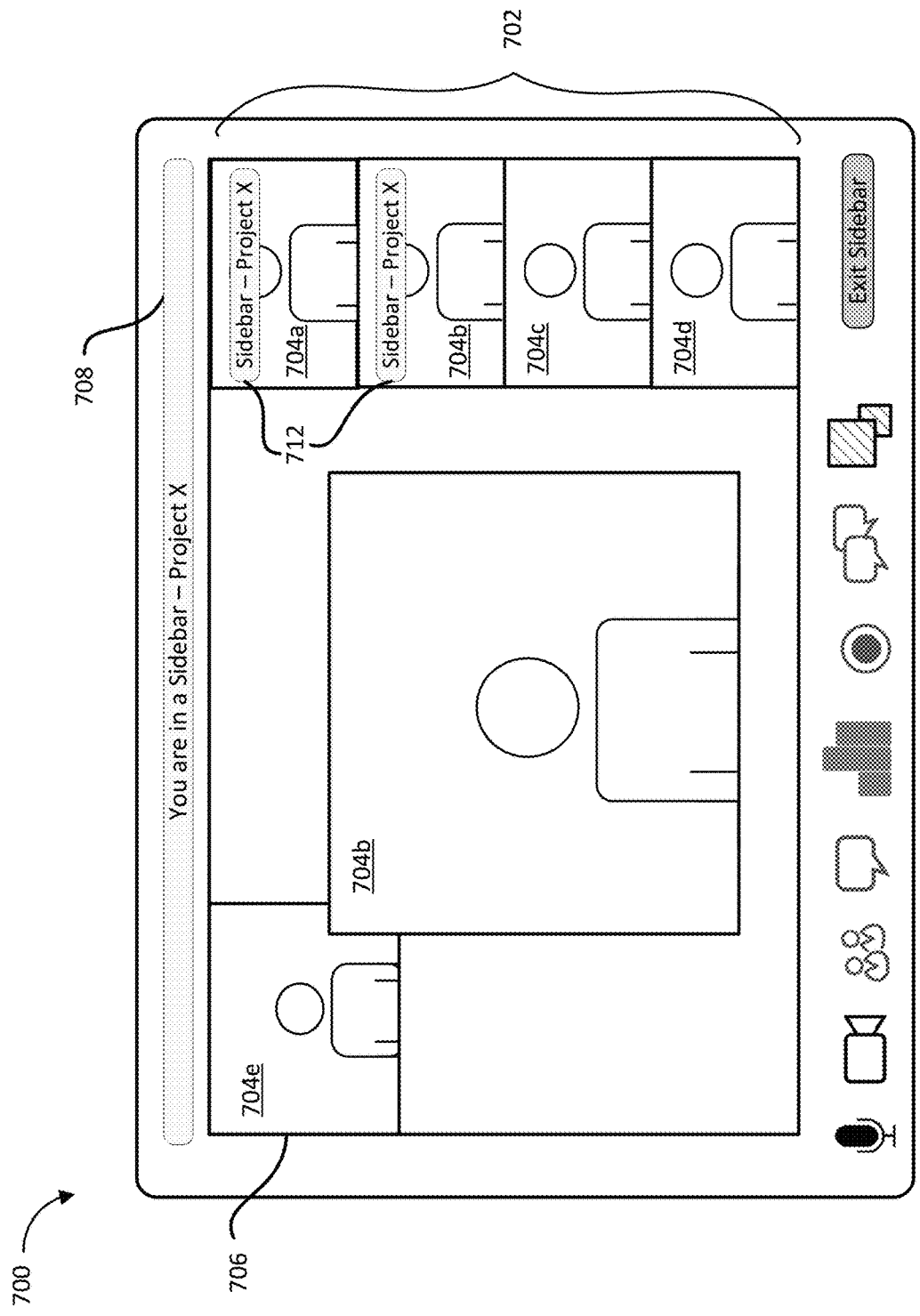
FIG. 7 illustrates a graphical user interface for a participant in a main meeting, according to an embodiment herein.

Turning now to FIG. 7, a GUI 700 is provided in which the participants in the main meeting are notified of the sidebar meeting. As illustrated, the GUI 700 is similar to the GUI 600 in that it is viewable to a participant in a sidebar meeting, such as participant 504*a* and 504*b*. In this example, however, instead of trying to hide the fact that participants 504*a* and 504*b* are in a sidebar meeting, there is a clear indication that the participants 504*a* and 504*b* are engaged in a sidebar meeting. As illustrated, a banner 712 may overlay each of the participant's 504*a* and 504*b* representation or name on the roster 702. In other embodiments, other types of indications may be used to indicate that the participants 504*a* and 504*b* are in a sidebar meeting.

When participants 504*a* and 504*b* enter a sidebar meeting, the initiator of the sidebar meeting may be prompted to provide a description of the sidebar meeting. As illustrated, the participant 504*a* indicated that the sidebar meeting was to discuss "Project X." By providing the subject matter of discussion in the sidebar meeting, participants remaining in the main meeting may be able to determine if they would like to join the sidebar meeting to discuss the topic. Indication 708 on the GUI 700 may also update for the participant 504*a* to specify which sidebar meeting the participant 504*a* is in. As noted above, this example may be particularly useful for main meetings that have a large number of participants and covers a variety of topics. This may allow participants to break off into specific sidebar meetings of interest to discuss topics as desired, while allowing the participants to receive content from the main meeting, via display 706.

When participants engage in a sidebar conversation, the participants may not be fully paying attention to the main meeting. The inattentiveness of the sidebar participants may result in the sidebar participants missing an attention cue. An attention cue may include personally identifiable information of a sidebar participant. For example, an attention cue may include the sidebar participant's name, a topic of interest to the sidebar participant, a project or topic that the sidebar participant is involved in, a location corresponding to the sidebar participant (e.g., office location or location of the sidebar participant), or a statement otherwise involving the sidebar participant. As can be imagined, if the speaker in the main meeting asks the sidebar participant a question and the sidebar participant is not paying attention, the sidebar participant may be faced with embarrassment or trouble for not participating in the main meeting. In some embodiments, the attention cue may include an emotion detection. For example, the attention cue may include a joke, laughter, anger, or raised voices during the main meeting. In other embodiments, the attention cue may include a change in video streams or content being shared during the main meeting.

To assist sidebar participants in remaining engaged in the main meeting and avoiding missing an attention cue, a voice agent may be provided while the participant is in a sidebar meeting. The voice agent may monitor the main meeting for attention cues while the sidebar participant is engaged in a sidebar conversation. If an attention cue is identified, the voice agent may notify the sidebar participant of the attention cue.

Returning now to FIGS. 3A and 3B, the voice agent functionality during a sidebar meeting is described with reference to example system 300A and 300B for ease of discussion. As noted above, the video conference provider 310 hosts the main meeting 365 and a sidebar meeting 350, if one is established during the main meeting 365. When the sidebar meeting 350 is established, a voice agent functionality may be invoked. The voice agent may monitor the audio and video streams of the main meeting 365 for attention cues for participants in the sidebar meeting 350. In some embodiments, the voice agent functionality may be specific to an individual participant in the sidebar meeting 350 (e.g., only monitoring for attention cues specific to that participant), or the voice agent functionality may monitor the main meeting 365 for attention cues for all participants in the sidebar meeting 350. Once invoked, the voice agent functionality may begin performing speech recognition on the audio and video streams of the main meeting 365.

To monitor the main meeting 365 for attention cues for a sidebar participant, the video and audio from each of the client devices 330 and 340a-m may be captured by the microphone and camera and the audio and video information may be forwarded to the video conference provider 310, which then distributes the audio and video generally as discussed above. To perform the voice agent functionality, the video conference provider 310 may identify the audio and video streams for the main meeting 365 and indicate that speech recognition should be performed on the incoming audio data from each of the client devices 330 and 340a-m participating in the main meeting 365. For example, the video conference provider 310 may identify a client device that is transmitting audio and video streams during the main meeting 365 and perform speech recognition on the corresponding audio data. In the cases where the speech recognition is performed by a different remote computing device, the video conference provider 310 may provide the identified audio data from the main meeting to the remote computing device for speech recognition purposes.

When the user joins the video conference, they can select an option to enable a voice agent, such as by enabling the voice agent functionality. Although the following example is described with respect to client device 340a, it should be understood that the following could apply to each of the client devices 330 and 340b-m. After enabling that functionality, the client device 340a sends an indication to the video conference provider 310 indicating the voice agent feature has been enabled. The voice agent functionality may include a speech recognition function and a search function. For example, once the voice agent functionality is enabled, the speech recognition function may be initiated. In response to enablement of the voice agent functionality, the video conference provider 310 may begin executing speech recognition on incoming audio data from each of the client devices 330 and 340b-m. Speech recognition may only be performed on the incoming audio data. For example, if only the host is speaking, then the video conference provider 310 may only perform speech recognition on the audio data from the host client device 330.

In some embodiments, the speech recognition function may be performed by a computing device other than the video conference provider 310. That is the speech recognition function of the voice agent may be locally enabled or cloud-based. For example, the client device 340a may execute speech recognition on the incoming audio data received by the video conference provider 310. Depending on the capabilities of the client device 340a, performing speech recognition by the client device 340a may be resource intensive and thus it may be preferred for the video conference provider 310, or another remote computer device, to perform speech recognition. In other embodiments, another remote computing device, such as a speech recognition third party, may perform speech recognition on the audio data received by the video conference provider.

To perform speech recognition, a transcript of the audio data may be generated. For example, if the speech recognition function of the voice agent is locally enabled, the client device 340a may receive or generate a substantially real-time transcript of the incoming audio data during the video conference. In other examples, the speech recognition function of the voice agent may be cloud-based. In such examples, the video conference provider 310, or another remote computing device, may generate the substantially real-time transcript of the incoming audio data during the video conference.

Once the speech recognition is performed, recognized words from the speech recognition process may be monitored to identify one or more attention cues for participant A corresponding to the client device 340a. In some embodiments, the speech recognition process may include emotion detection. For example, the speech recognition process may include monitoring for laughter or anger in the audio streams. The attention cue identification function of the voice agent may be separate from the speech recognition function. For example, the speech recognition function may be performed remotely while the attention cue identification may be performed locally by the client device 340a. In other embodiments, both functions may be performed remotely or both functions may be performed locally. In embodiments, the attention cue identification may be stored and/or performed locally on the client device 340a.

It should be appreciated that the voice agent functionality may be enabled or disabled at any time during a meeting. Enabling or disabling the functionality will cause the client device 340a to transmit an indication to the video conference provider 310 to activate or deactivate speech recognition for incoming audio to the client device 340a. Further, as noted above, while this example is discussed with respect to client device 340a, any of the client device 330 and 340b-340m may take advantage of such functionality by enabling respective voice agent functionality as discussed herein.

In some embodiments, the voice agent may be integrated into the video conferencing software. In other embodiments, the voice agent may be a standalone application from the video conferencing application. For example, upon initiation of the video conferencing application, the voice agent application may automatically launch. In cases where the voice agent functionality is disabled upon launch of a video conference, the voice agent application may launch when the voice agent functionality is enabled by the user of the client device.

Once speech recognition is performed on the incoming audio data received by the client device 340a, the recognized words from the speech recognition may be provided to the voice agent to perform the attention cue identification function. The recognized words include detected emotions. For example, laughter may be considered a recognized word. The recognized words may be provided to the attention cue identification function of the voice agent running on the client device 340a substantially in real-time. In cases where the attention cue identification function is performed remotely, the recognized words from the speech recognition may be provided to the remote computing device to perform the attention cue identification function. Depending on where speech recognition is performed, the processing capabilities of the computing device performing speech recognition, and network conditions (if speech recognition is performed remotely from the client device), recognized words may be provided to the voice agent within a few seconds of the user speaking them. For example, in some embodiments, the voice agent may not include a speech recognition function. Instead, the voice agent may receive the recognized words, for example via a transcript of the audio, from a remote computing device.

Figure 8:
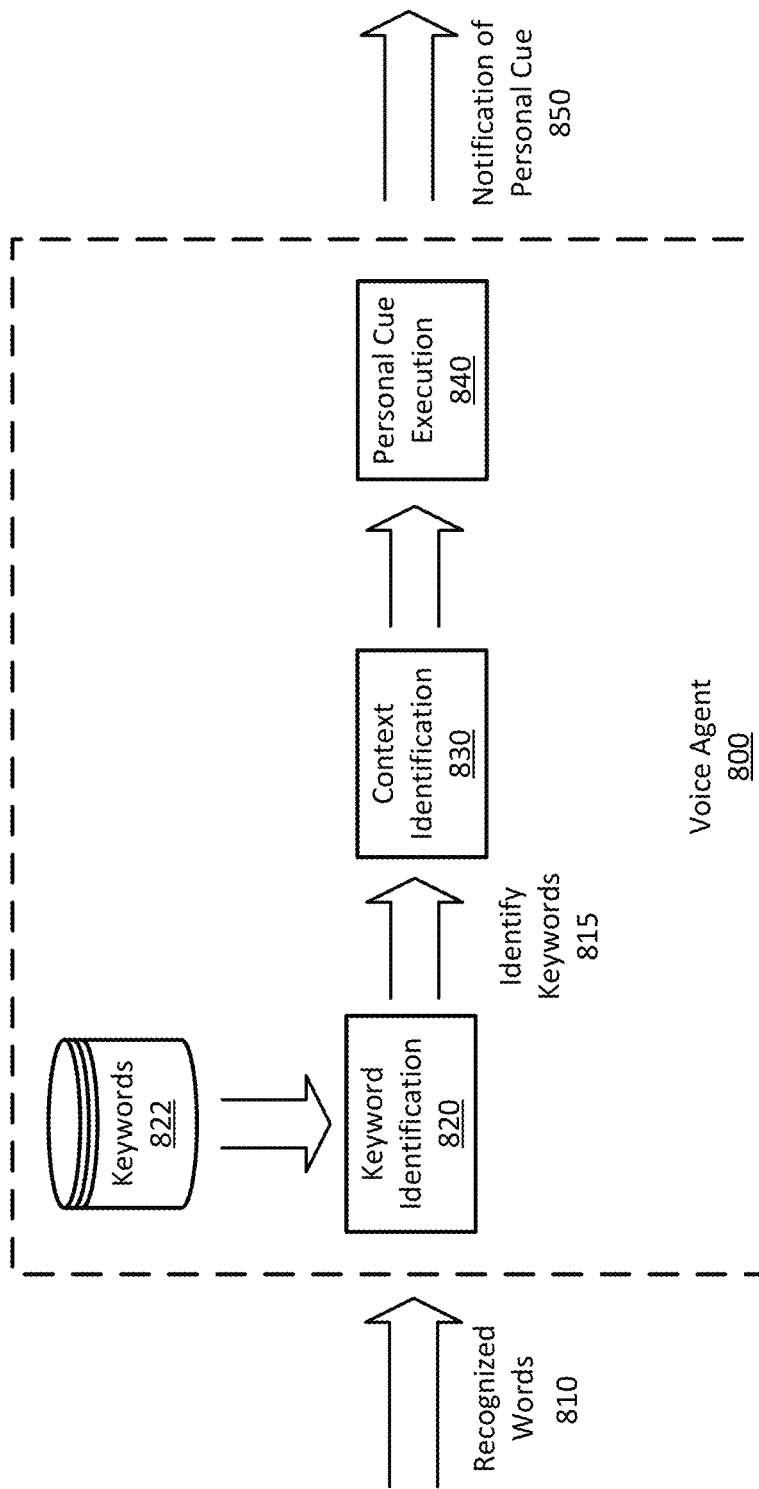
FIG. 8 illustrates an example of a voice agent that may be executed by a client device for performing the voice agent functionality, according to an embodiment herein.

Upon receiving the recognized words, the voice agent may analyze the recognized words for attention cue keywords ("keywords"). Turning now to FIG. 8, FIG. 8 illustrates an example of a voice agent 800 that may be executed by a client device, such as client device 340a, for performing the voice agent functionality. In FIG. 8, the voice agent 800 receives recognized words 810 from speech recognition based on audio received by the client device 340a and/or the audio data identified as incoming from the main meeting, from the video conference provider 310. In this example, a transcript including the recognized words 810 is received by the client device 340a from the video conference provider 310. As discussed previously, however, speech recognition may be performed locally at the client device 304a or at any suitable remote computing device, such as a cloud server dedicated to speech recognition. In those cases, the client device 340a may receive the recognized words 810 from that respective computing device. It should also be appreciated that although in this example the attention cue identification function is performed by the client device 340a, this functionality may be performed by the video conference provider 310 or another remote computing device.

In some embodiments, the recognized words 810 from a transcription of the main meeting audio data may be input into the voice agent 800 to identify one or more keywords 815. Once recognized words 810 have been received, the voice agent 800 can perform keyword identification 820 using a database of keywords 822 to identify keywords 815. It should be appreciated that in some examples, recognized words 810 will be streamed to the client device as speech recognition is performed. Thus, receiving recognized words 810 may be a continuous process while the meeting proceeds.

The database of known keywords 822 may be queried to identify any keywords in the stream of recognized words 810. Keywords in the keyword database 822 may be based on the participant for which the voice agent function is being invoked. For example, the voice agent functionality is invoked for the client device 340a, then the keywords in the keyword database 822 may relate to or be based on the participant A. The keywords may include words relating to the identity of the participant A, such as the first and last name of the participant A. In some cases, the keywords may include an office or location of the participant A. Other keywords may include the names of projects, areas, or topics that the participant A is involved in. In some embodiments, keywords may include one or more emotion expressions, such as laughter. In some embodiments, the voice agent may perform an analysis of the video stream from the camera of the client device 340a for identifying objects in the background of the participant A's video stream. In this way, if a speaker during the main meeting calls out an identifiable object in the participant A's background, the participant A can be notified that the speaker is referencing him or her.

The keywords in the keyword database 822 may be gathered from the participant A or from the client device 340a. For example, upon enabling the voice agent functionality, the participant A may be prompted to input attention cue keywords that the voice agent should monitor the main meeting for (e.g., a project name). In other embodiments, the voice agent may receive some or all the keywords from the participant's profile with the video conference provider 310. In still other embodiments, the voice agent may gather keywords from applications on the client device 340a. If the voice agent has permission to search other applications on the client device 340a, the voice agent may gather keywords from folders, calendars, emails, or other applications running on the client device 340a.

It should be understood that a keyword may include more than one word. For example, "Project Alpha" may be a "keyword" as indicating that the phrase "Project Alpha" is an attention cue to participant A. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look for," "looking for," and "looked for." In some examples each of these may be a distinct keyword, while in other examples, the variants may be associated with a base term, e.g., "look," that is used as the keyword. However, any suitable approach to recognizing keywords may be used.

If one or more keywords 815 is recognized, the voice agent 800 then may identify a context 830 associated with the keyword 815. In this example, to identify a context, the voice agent 800 may employ a trained machine learning ("ML") technique to semantically analyze the speech or transcript associated with the identified keyword 815 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

The ML technique may receive the sequence of words and determine whether an attention cue was intended. For example, if the main meeting speaker says "You're out in Denver," the ML technique may semantically analyze the words and determine that the speaker is providing an attention cue to a participant located in Denver. Similarly, if the speaker says "You are with the Denver Office," the ML technique can semantically analyze and determine that the speaker is intending an attention cue to a participant in Denver. Alternatively, if the speaker says "I think Jack Nicholson's character in the Shining was living in Denver" the ML technique may determine that no attention cue involving the participant located in Denver was intended and refrain from alerting the participant of an attention cue.

While ML techniques may be employed in some examples, other examples of context identification 830 functionality may perform word searches for attention cue words or phrases within a predetermined number of words from the identified keyword(s) 415. For example, considering the example above where the speaker says "you are with the Denver Office," the context identification may perform a search for certain words preceding Denver or Office, such as "you are," "with," etc. If one of those words is found preceding "Denver or Office" by a predetermined number of words, the context identification 830 functionality may determine that the term "Denver" or "Office" was meant as an attention cue relating to the location of a participant.

Since people may use jargon or colloquial terms to refer to particular actions, the context identification 830 functionality may normalize recognized words to specific meanings. For example, the terms "located," "with," "out in," "based out of," etc. all refer to a location of a participant. Thus, the context identification 830 functionality may map such terms to have a single meaning (e.g., location). Such mappings may be provided for multiple different phrases and corresponding terms. Similarly, synonyms or words related to keywords may also be identified. For example, if a participant is working on a project labeled "the White House," the context identification 830 may identify words relating to "the White House" such as "president" or "Washington, DC."

Once the context identification 830 has identified the one or more keywords 815 and identified the context of the identified keywords 815, the voice agent 800 may perform an attention cue execution 840. The voice agent 800 may determine, based on the identification of the keywords 815, and the context of the keywords, that an attention cue for the participant A has been identified during the main meeting. The attention cue execution 840 may communicate with the video conferencing software to notify the participant A of the attention cue. The voice agent 800 may transmit instructions to the video conferencing software, or initiate instructions within the video conferencing software if the voice agent 800 is part of the video conferencing software, to provide a notification of the attention cue 850 to the user.

Figure 9:
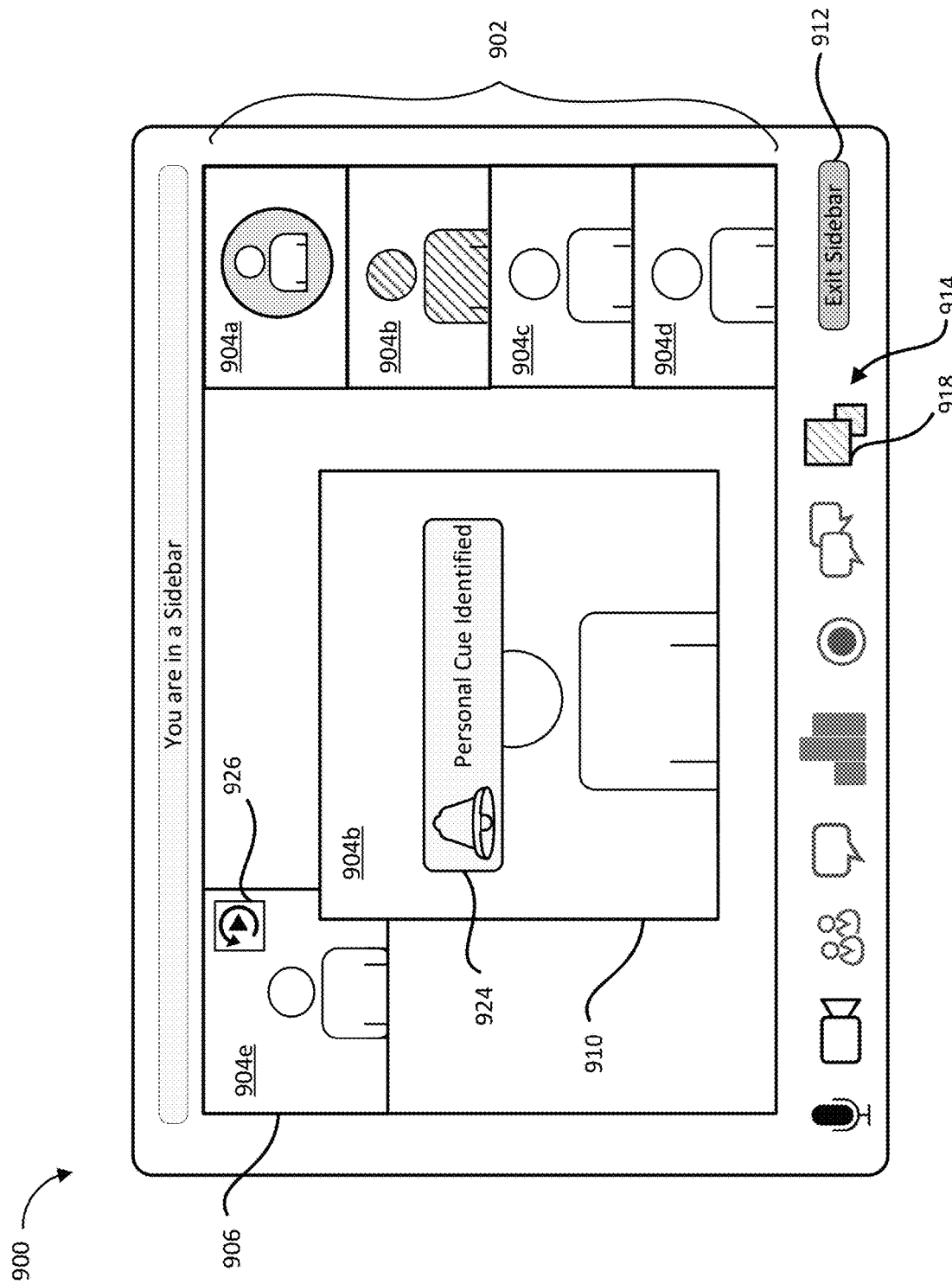
FIG. 9 illustrates an example notification displayed to a participant in a sidebar meeting of an attention cue, according to an embodiment herein.

Providing a notification of an attention cue 850 to a participant in sidebar meeting may be done in a variety of ways. Referring to FIG. 9, an example notification displayed to a participant in a sidebar meeting of an attention cue is provided. FIG. 9 provides a GUI 900 that may be viewable to a participant in a sidebar meeting. The GUI 900 may be the same or similar to the GUI 600 or the GUI 700. As illustrated, participant 904a may be in sidebar meeting with the participant 904b. In the sidebar meeting, the GUI 900 may provide a display 910 of the video stream from the participant 904b. The participant 904a may also receive the corresponding audio stream from the participant 904b.

In addition to the display 910, the GUI 900 may also include the display 906 of the video streams from the main meeting. As depicted, participant 904e may be presenting during the main meeting. In this example, the participant 904e may ask the participant 904a a question. Since the participant 904a is in the sidebar meeting with the participant 904b, the participant 904a may not hear or catch the question from the participant 904e. To notify the participant 904a that the participant 904e is addressing him or her in the main meeting, the voice agent may provide a notification 924 on the GUI 900 indicating the attention cue for the participant 904a.

As illustrated, the notification 924 may be displayed prominently on the GUI 900 so to catch the attention of the participant 904a. In some embodiments, the notification 924 may cover a portion of the display 910 of the video stream from the sidebar meeting. In other embodiments, the notification 924 may be an audible notification. For example, bell, chime, or other sound may be used to alert the participant 904a of the attention cue. In other embodiments, a volume of the audio stream from the main meeting may increase and/or the display of the video stream from the main meeting may change in size, such as increase, to draw attention to the main meeting. In some embodiments, a transcription of the audio stream from the main meeting may be provided via the GUI 900 when the participant 904A joins the sidebar meeting. In such cases, the notification 924 may include an increase in the text size of the transcription of the audio stream from the main meeting.

Upon receiving the notification 924 of the attention cue, the participant 904a may increase the audio from the main meeting to determine if he or she needs to reenter the main meeting. In some embodiments, the volume of the audio for the main meeting may automatically increase upon notification 924 of the attention cue. The volume may be held increased for a duration of time (e.g., 5-30 seconds) before returning to the previously set volume. This may also serve to alert the participant 904a of the attention cue. Additionally, the increase in volume may allow the participant 904a to determine whether he or she needs to return to the main meeting to respond to the attention cue. In some embodiments, in addition to or instead of increasing the volume of the audio from the main meeting, the volume of the audio from the sidebar meeting may be decreased or even muted. Similarly, a decrease in volume of the audio from the sidebar meeting may serve to notify the participant 904a of the attention cue or allow the participant 904a to better hear the audio from the main meeting.

If the participant 904a determines that he or she needs to return to the main meeting, for example to respond to the identified attention cue, the participant 904a can use a sidebar exit button 912 or the sidebar selection button 918 on dashboard 914, as described above. In some examples, the participant 904a may select the display 906 for the main meeting to change their focus from the sidebar meeting to the main meeting, but without leaving the sidebar meeting. In some embodiments, the participant 904a may want to understand the context of the attention cue. To do so, the participant 904a may select a replay selection 926. As discussed above, the replay selection 926 may provide a snippet replay of the audio and video streams from the main meeting for a few seconds before and/or after the attention cue was identified to provide context to the participant 904a. The replay selection 926 may appear on display 906 of the video stream from the main meeting when the notification 924 is displayed to the participant 904a. In other embodiments, the replay selection 926 may always be provided on display 906 and allow the participant 904a to replay a short segment of the audio and video streams from the main meeting. In such cases, the replay selection 926 may provide the replay functionality to sidebar participants at any time. This may allow sidebar participants to gain context on information that may have caught their attention while in the sidebar meeting, regardless of attention cue notifications.

Upon exiting the sidebar meeting, and reentering the main meeting, the representation of the participant 904*a* on the roster 902 may transition to a live video stream of the participant 904*a*, as described above.

Figure 10:
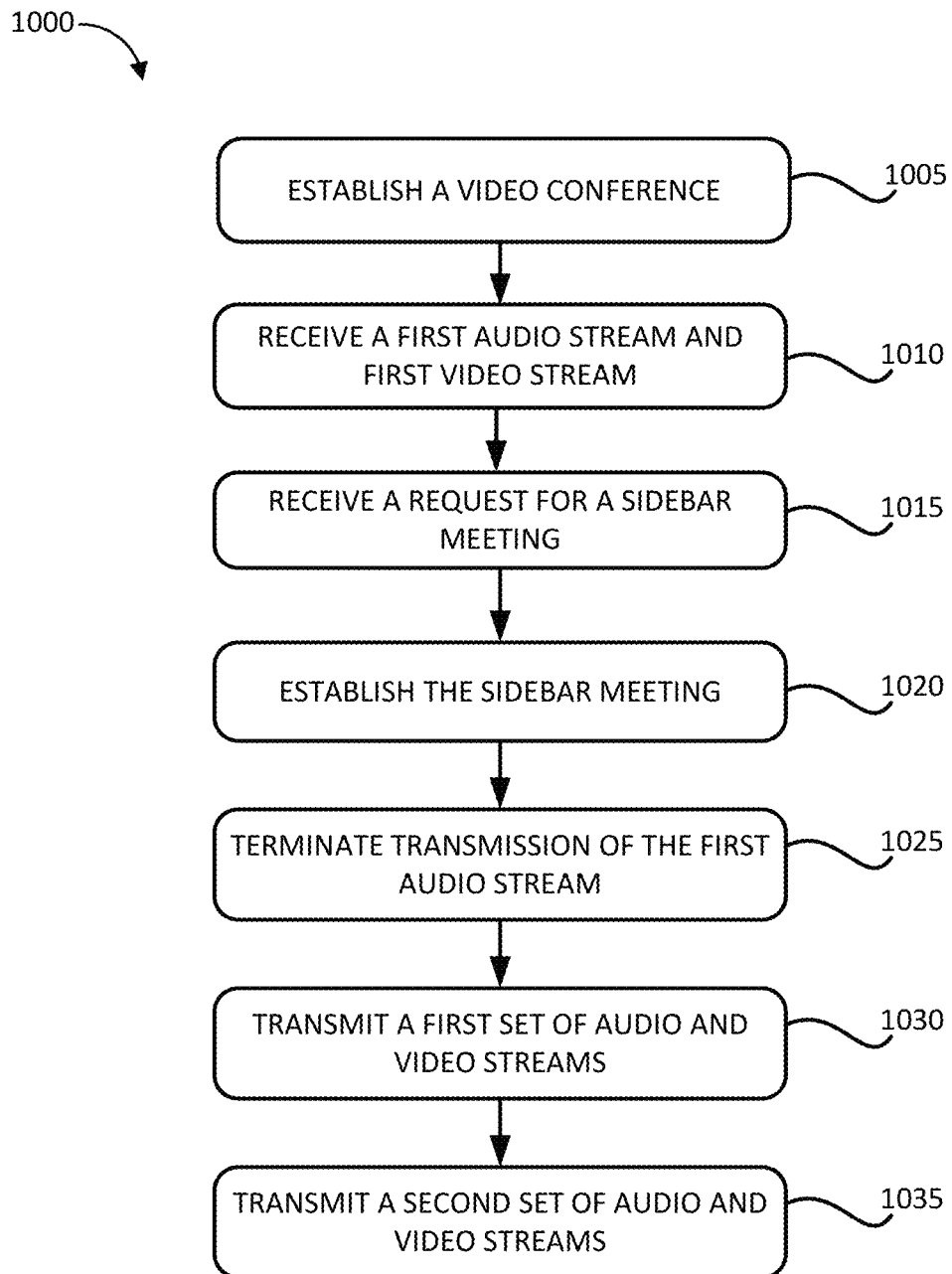
FIG. 10 depicts an exemplary method for providing a sidebar meeting during a main meeting, according to an embodiment herein.

Referring now to FIG. 10, a flowchart of an example method 1000 for providing a sidebar meeting during a video conference is provided. The description of the method 1000 in FIG. 10 will be made with reference to FIGS. 3A-9, however any suitable system according to this disclosure may be used, such as the example systems 100 and 200, shown in FIGS. 1 and 2.

Method 1000 may include step 1005. At step 1005, a video conference may be established. The video conference may include one or more participants and include one or more client devices. The video conference may be established by a video conference provider, such as video conference provider 310. At step 1010, a first audio stream and a first video stream may be received from a first client device. The first client device may be part of the client devices included in the video conference. The first audio stream and the first audio stream may be received by the video conference provider 310.

At step 1015, a request for a sidebar meeting may be received. The request for the sidebar meeting may be received from the first client device. The request for the sidebar meeting may request the sidebar meeting with a second client device. Following the request for the sidebar meeting, a sidebar meeting may be established at step 1020. The video conference provider 310 may establish the sidebar meeting, such as the sidebar meeting 350, between the first client device and the second client device.

Responsive to establishing the sidebar meeting, the method 1000 may include steps 1025 and 1030. At step 1025, transmission of the first audio stream may be terminated. For example, the video conference provider 310 may terminate transmission of the first audio stream from the first client device to the client devices in the video conference. At step 1030, a first set of audio and video streams and a second set of audio and video streams may be transmitted to the first client device. The first set of audio and video streams may correspond to the main meeting, such as the main meeting 365, and the second set of audio and video streams may correspond to the sidebar meeting, such as the sidebar meeting 350. In some embodiments, the method 1000 may further include terminating transmission, to the client devices, the first video stream from the first client device, and transmitting, to the client devices, a representation of a participant corresponding to the first client device. For example, the representation of the participant may be an avatar, an image, or a loop snippet of the participant.

In some examples, the method 1000 may further include receiving, from the first client device, a request to exit the sidebar meeting. Responsive to the request to exit the sidebar meeting, the method 1000 may include terminating transmission, to the first client device, the second set of audio and video streams corresponding to the sidebar meeting; and resuming transmission, to the client devices, the first audio stream from the first client device. In some cases, resuming transmission of the first audio stream from the first client device may include transitioning from the representation of the participant corresponding to the first client device to the first video stream from the first client device. Optionally, the method 1000 may include displaying, on the first client device, an indication that the first client device is in the sidebar meeting.

Figure 11:
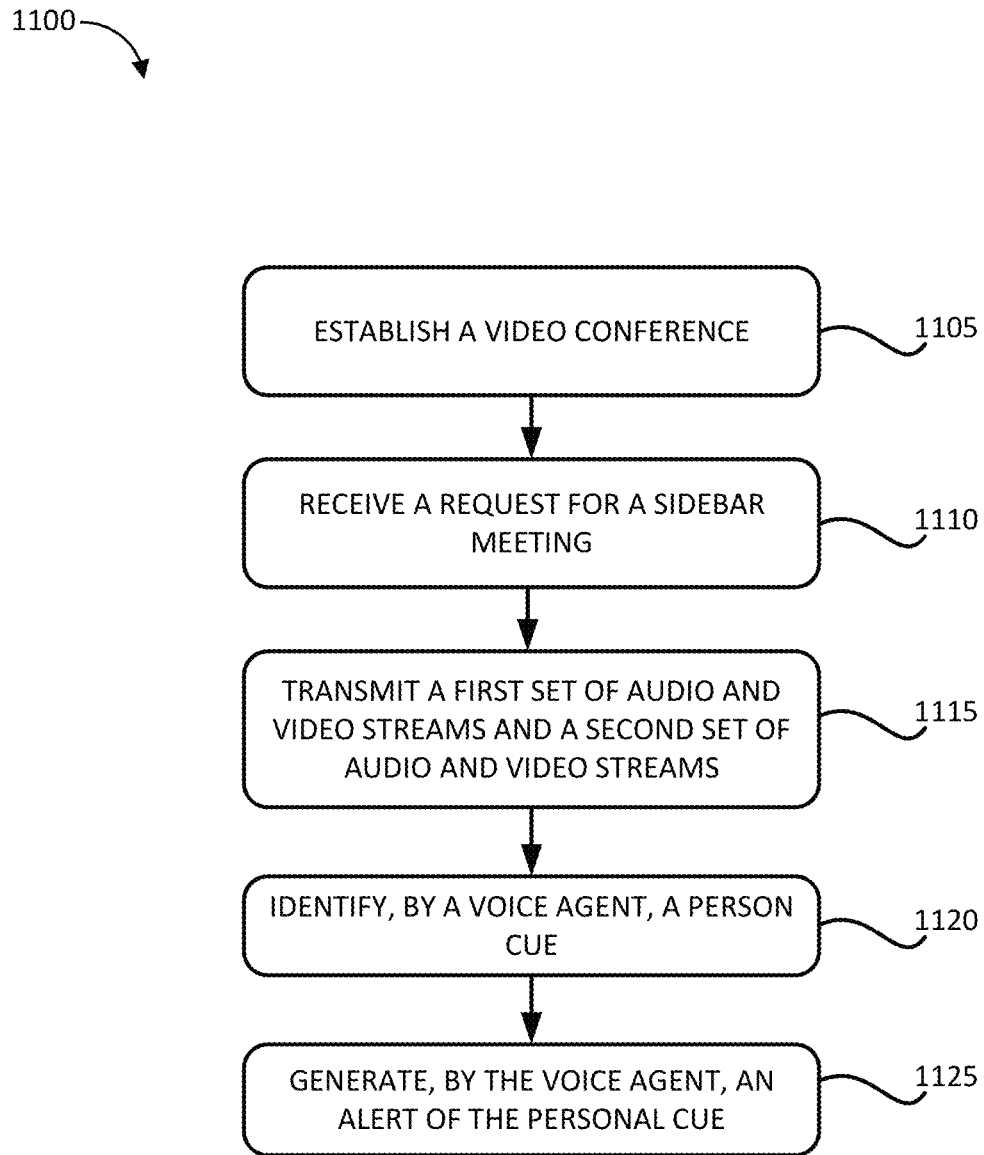
FIG. 11 depict an exemplary method for providing voice agent functionality for a sidebar meeting during a video conference, according to an embodiment herein.

Referring now to FIG. 11, a flowchart of an example method 1100 for providing voice agent functionality for a sidebar meeting during a video conference is provided. The description of the method 1100 in FIG. 11 will be made with reference to FIGS. 3A-10, however any suitable system according to this disclosure may be used, such as the example systems 100 and 200, shown in FIGS. 1 and 2.

The method 1100 may include a step 1105. At step 1105, a video conference may be established. The video conference may include one or more participants and include one or more client devices. The video conference may be established by a video conference provider, such as video conference provider 310.

The method 1100 may include a step 1110. At step 1110, a request for a sidebar meeting may be received. The request for the sidebar meeting may be received from the first client device. In examples, the request for the sidebar meeting may request the sidebar meeting with a second client device. Following the request for the sidebar meeting, a sidebar meeting may be established. The video conference provider 310 may establish the sidebar meeting, such as the sidebar meeting 350, between the first client device and the second client device.

The method 1100 may include step 1115. At step 1115, a first set of audio and video streams and a second set of audio and video streams may be transmitted to the first client device. The first set of audio and video streams may correspond to the main meeting, such as the main meeting 365, and the second set of audio and video streams may correspond to the sidebar meeting, such as the sidebar meeting 350. In some embodiments, the method 1100 may further include terminating transmission, to the client devices, the first video stream from the first client device, and transmitting, to the client devices, a representation of a participant corresponding to the first client device. For example, the representation of the participant may be an avatar, an image, or a loop snippet of the participant.

The method 1100 may include identifying, by a voice agent, an attention cue in an audio stream from the first set of audio and video streams corresponding to the main meeting, at step 1120. The attention cue may be personally identifiable information corresponding to a participant in the sidebar meeting. In an example embodiment, step 1120 may include performing, by a computing device, speech recognition on the audio stream from the first set of audio and video streams to identify the attention cue. The computing device may be hosted by the video conference provider 310 or hosted by a third-party server. In some embodiments, performing, by the computing device, speech recognition on the audio stream from the first set of audio and video streams may include transcribing, by the computing device, the audio stream from the first set of audio and video streams to generate a transcription of the audio stream and identifying, by the voice agent, the attention cue from the transcription of the audio stream. For example, the one or more keywords may be identified from the transcription. The one or more keywords may be based on personal information of a user of the first client device.

Figure 12:
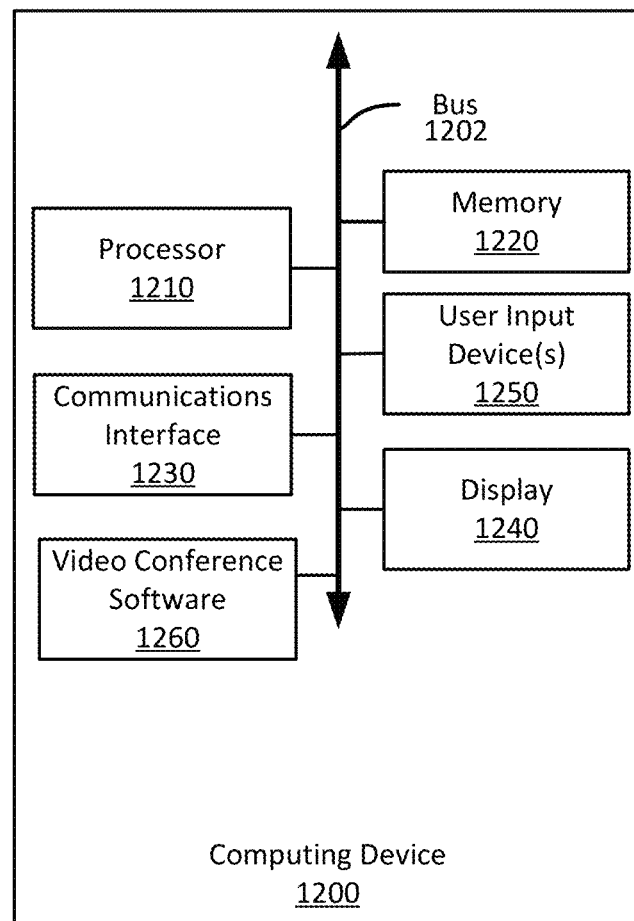
FIG. 12 shows an example computing device suitable for providing a sidebar meeting during a video conference and/or providing voice agent functionality during the sidebar meeting, according to this disclosure.

Referring now to FIG. 12, FIG. 12 shows an example computing device 1200 suitable for use in example systems or methods for providing a sidebar meeting during a video conference and/or providing voice agent functionality during the sidebar meeting. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for providing a sidebar meeting during a video conference, such as part or all of the example method 1000, described above with respect to FIG. 10. The processor 1210 may also be configured to execute processor-executable instructions stored in the memory 1220 to perform one or more method for providing a voice agent functionality during a sidebar meeting, such as part or all of the example method 1100, described above with respect to FIG. 11. The computing device, in this example, also includes one or more user input devices 1250, such as a keyboard, mouse, touchscreen, video input device (e.g., one or more cameras), microphone, etc., to accept user input. The computing device 1200 also includes a display 1240 to provide visual output to a user.

The computing device 1200 also includes a communications interface 1230. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a video conference having a plurality of participants, wherein the video conference comprises a plurality of client devices; receive, from a first client device, a first audio stream and a first video stream; receive, from the first client device, a request for a sidebar meeting with a second client device; establish the sidebar meeting for the first client device; and responsive to establishing the sidebar meeting: terminate transmission of the first audio stream to the plurality of client devices; and transmit to the first client device: a first set of audio and video streams corresponding to a main meeting; and a second set of audio and video streams corresponding to the sidebar meeting.

Example 2 is the system of any previous or subsequent example, wherein the processor is configured to execute further processor-executable instructions stored in the non-transitory computer-readable medium to: responsive to establishing the sidebar meeting, terminate transmission, to the plurality of client devices, of the first video stream from the first client device; and transmit, to the plurality of client devices, a representation of a participant corresponding to the first client device.

Example 3 is the system of any previous or subsequent example, wherein the processor is configured to execute further processor-executable instructions stored in the non-transitory computer-readable medium to: receive, from the first client device, a request to prepare a loop snippet of the participant; record, via the first client device, a short segment of the first video stream from the first client device; and transmit, to the plurality of client devices, the loop snippet of the participant as a representation of the participant corresponding to the first client device.

Example 4 is the system of any previous or subsequent example, wherein the processor is configured to execute further processor-executable instructions stored in the non-transitory computer-readable medium to: receive, from the second client device, an acceptance of the request for the sidebar meeting; and establish the sidebar meeting responsive to the acceptance of the request for the sidebar meeting.

Example 5 is the system of any previous or subsequent example, wherein the processor is configured to execute further processor-executable instructions stored in the non-transitory computer-readable medium to: receive, from the second client device, a second audio stream and a second video stream; join the second client device to the sidebar meeting; terminate transmission, to the plurality of client devices, of the second audio stream from the second client device; and transmit to the second client device: the first set of audio and video streams corresponding to a main meeting; and the second set of audio and video streams corresponding to the sidebar meeting.

Example 6 is the system of any previous or subsequent example, wherein the processor is configured to execute further processor-executable instructions stored in the non-transitory computer-readable medium to: responsive to establishing the sidebar meeting for the first client device, transmit access information for the sidebar meeting to the first client device; and responsive to receiving, from the second client device, an acceptance to the request for the sidebar meeting, transmit access information for the sidebar meeting to the second client device.

Example 7 is the system of any previous or subsequent example, wherein the processor is configured to execute further processor-executable instructions stored in the non-transitory computer-readable medium to: receive, from the first client device, a request to exit the sidebar meeting; and responsive to the request to exit the sidebar meeting: terminate transmission, to the first client device, of the second set of audio and video streams corresponding to the sidebar meeting; and resume transmission, to the plurality of client devices, of the first audio stream from the first client device.

Example 8 is a method comprising: establishing a video conference having a plurality of participants, wherein the video conference comprises a plurality of client devices; receiving, from a first client device, a first audio stream and a first video stream; receiving, from the first client device, a request for a sidebar meeting with a second client device; establishing the sidebar meeting for the first client device; and responsive to establishing the sidebar meeting: terminating transmission of the first audio stream to the plurality of client devices; and transmitting to the first client device: a first set of audio and video streams corresponding to a main meeting; and a second set of audio and video streams corresponding to the sidebar meeting.

Example 9 is the method of any previous or subsequent example, wherein responsive to establishing the sidebar meeting the method further comprises: terminating transmission, to the plurality of client devices, of the first video stream from the first client device; and transmitting, to the plurality of client devices, a representation of a participant corresponding to the first client device.

Example 10 is the method of any previous or subsequent example, further comprising: receiving, from the first client device, a request to exit the sidebar meeting; and responsive to the request to exit the sidebar meeting: terminating transmission, to the first client device, of the second set of audio and video streams corresponding to the sidebar meeting; and resuming transmission, to the plurality of client devices, of the first audio stream from the first client device.

Example 11 is the method of any previous or subsequent example, wherein resuming transmission, to the plurality of client devices, of the first audio stream from the first client device comprises: transitioning from the representation of the participant corresponding to the first client device to the first video stream from the first client device.

Example 12 is the method of any previous or subsequent example, wherein the representation of the participant comprises a loop snippet of the participant corresponding to the first client device.

Example 13 is the method of any previous or subsequent example, further comprising: displaying, on the first client device, an indication that the first client device is in the sidebar meeting.

Example 14 is a non-transitory computer-readable medium comprising processor-executable instructions configured to cause one or more processors to: establish a video conference having a plurality of participants, wherein the video conference comprises a plurality of client devices; receive, from a first client device, a first audio stream and a first video stream; receive, from the first client device, a request for a sidebar meeting with a second client device; establish the sidebar meeting for the first client device; and responsive to establishing the sidebar meeting: terminate transmission of the first audio stream to the plurality of client devices; and transmit to the first client device: a first set of audio and video streams corresponding to a main meeting; and a second set of audio and video streams corresponding to the sidebar meeting.

Example 15 is the non-transitory computer-readable medium of any previous or subsequent example, wherein the processor is configured to execute further processor-executable instructions stored in the non-transitory computer-readable medium to: terminate transmission, to the plurality of client devices, of the first video stream from the first client device; and transmit, to the plurality of client devices, a representation of a participant corresponding to the first client device.

Example 16 is the non-transitory computer-readable medium of any previous or subsequent example, wherein the instructions to transmit, to the plurality of client devices, the representation of the participant corresponding to the first client device further causes the processor to execute further processor-executable instructions stored in the non-transitory computer-readable medium to: transmit, to the plurality of client devices, a loop snippet of the participant.

Example 17 is the non-transitory computer-readable medium of any previous or subsequent example, wherein the processor is configured to execute further processor-executable instructions stored in the non-transitory computer-readable medium to: indicate, on a roster of the main meeting, that the first client device is in a sidebar meeting.

Example 18 is the non-transitory computer-readable medium of any previous or subsequent example, wherein the processor is configured to execute further processor-executable instructions stored in the non-transitory computer-readable medium to: responsive to transmitting, to the first client device, the first set of audio and video streams corresponding to the main meeting, automatically decrease a volume of audio streams from the first set of audio and video streams from the main meeting.

Example 19 is the non-transitory computer-readable medium of any previous or subsequent example, wherein automatically decreasing the volume of the audio streams from the first set of audio and video streams comprises muting the audio streams from the first set of audio and video streams from the main meeting.

Example 20 is the non-transitory computer-readable medium of any previous or subsequent example, wherein the processor is configured to execute further processor-executable instructions stored in the non-transitory computer-readable medium to: receive, from the first client device, a request to exit the sidebar meeting; and responsive to the request to exit the sidebar meeting: terminate transmission, to the first client device, of the second set of audio and video streams corresponding to the sidebar meeting; and resume transmission, to the plurality of client devices, of the first audio stream from the first client device.

That which is claimed is:

1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
establish a video conference having a plurality of participants, wherein the video conference comprises a plurality of client devices;
receive, from a first client device of a participant, a request for a sidebar meeting with a second client device;
establish the sidebar meeting for the first client device;
responsive to establishing the sidebar meeting:
transmit to the first client device:
a first set of audio and video streams corresponding to a main meeting, the first set of audio and video streams including a first audio stream and a first video stream; and
a second set of audio and video streams corresponding to the sidebar meeting;
transmit, to the plurality of client devices, a loop snippet associated with the participant as a representation corresponding to the first client device, the loop snippet being a video loop; and
transition from the loop snippet to a video stream of the participant.

2. The system of claim 1, wherein the processor is configured to execute further processor-executable instructions stored in the non-transitory computer-readable medium to:
responsive to establishing the sidebar meeting, transmit, to the plurality of client devices, the representation of the participant corresponding to the first client device.

3. The system of claim 1, wherein the processor is configured to execute further processor-executable instructions stored in the non-transitory computer-readable medium to:
generate the loop snippet, the loop snippet being a loop of a recording of a segment of a video stream from the first client device.

4. The system of claim 1, wherein the processor is configured to execute further processor-executable instructions stored in the non-transitory computer-readable medium to:
receive, from the second client device, an acceptance of the request for the sidebar meeting; and
establish the sidebar meeting responsive to the acceptance of the request for the sidebar meeting.

5. The system of claim 4, wherein the processor is configured to execute further processor-executable instructions stored in the non-transitory computer-readable medium to:
receive, from the second client device, a second audio stream and a second video stream;
join the second client device to the sidebar meeting;
terminate transmission, to the plurality of client devices, of the second audio stream from the second client device; and
transmit to the second client device:
the first set of audio and video streams corresponding to the main meeting; and
the second set of audio and video streams corresponding to the sidebar meeting.

6. A method comprising:
establishing a video conference having a plurality of participants, wherein the video conference comprises a plurality of client devices;
receiving, from a first client device, a request for a sidebar meeting with a second client device;
establishing the sidebar meeting for the first client device;
responsive to establishing the sidebar meeting:
transmitting to the first client device:
a first set of audio and video streams corresponding to a main meeting, the first set of audio and video streams including a first audio stream and a first video stream; and
a second set of audio and video streams corresponding to the sidebar meeting;
transmitting, to the plurality of client devices, a loop snippet associated with the participant as a representation corresponding to the first client device, the loop snippet being a video loop; and
transitioning from the loop snippet to a video stream of the participant.

7. The method of claim 6, wherein responsive to establishing the sidebar meeting the method further comprises:
transmitting, to the plurality of client devices, the representation of the participant corresponding to the first client device.

8. The method of claim 7, further comprising:
receiving, from the first client device, a request to exit the sidebar meeting; and
responsive to the request to exit the sidebar meeting, terminating transmission, to the first client device, of the second set of audio and video streams corresponding to the sidebar meeting.

9. The method of claim 6, further comprising:
displaying, on the first client device, an indication that the first client device is in the sidebar meeting.

10. A non-transitory computer-readable medium comprising processor-executable instructions configured to cause one or more processors to:
- establish a video conference having a plurality of participants, wherein the video conference comprises a plurality of client devices;
- receive, from a first client device of a participant, a request for a sidebar meeting with a second client device;
- establish the sidebar meeting for the first client device;
- responsive to establishing the sidebar meeting:
  - transmit to the first client device:
    - a first set of audio and video streams corresponding to a main meeting, the first set of audio and video streams including a first audio stream and a first video stream; and
  - a second set of audio and video streams corresponding to the sidebar meeting;
- transmit, to the plurality of client devices, a loop snippet associated with the participant as a representation corresponding to the first client device, the loop snippet being a video loop; and
- transition from the loop snippet to a video stream of the participant.

11. The non-transitory computer-readable medium of claim 10, further comprising instructions that are executable by the one or more processors to:
- Responsive to establishing the sidebar meeting, transmit, to the plurality of client devices, the representation of the participant corresponding to the first client device.

12. The non-transitory computer-readable medium of claim 11, wherein the loop snippet is a recorded video segment played in a loop.

13. The non-transitory computer-readable medium of claim 10, further comprising instructions that are executable by the one or more processors to:
- indicate, on a roster of the main meeting, that the first client device is in the sidebar meeting.

14. The non-transitory computer-readable medium of claim 10, further comprising instructions that are executable by the one or more processors to:
- automatically decrease a volume of the first audio stream in response to the participant joining the sidebar meeting; and
- automatically increase the volume of the first audio stream in response to the participant exiting the sidebar meeting.

15. The system of claim 1, wherein the processor is configured to execute further processor-executable instructions stored in the non-transitory computer-readable medium to:
- detect an attention cue by analyzing the first audio stream using a trained machine-learning model.

16. The system of claim 1, wherein the processor is configured to execute further processor-executable instructions stored in the non-transitory computer-readable medium to:
- detect an attention cue by analyzing the first audio stream for a topic, a geographical location, or a project associated with the participant.

17. The system of claim 1, wherein the processor is configured to execute further processor-executable instructions stored in the non-transitory computer-readable medium to:
- detect an attention cue by analyzing the first audio stream for contextual information associated with one or more keywords.

18. The system of claim 1, wherein the processor is configured to execute further processor-executable instructions stored in the non-transitory computer-readable medium to:
- detect an attention cue based on an emotion exhibited in the first audio stream.

* * * * *